United States Patent
Chhibber et al.

(10) Patent No.: US 11,706,041 B2
(45) Date of Patent: Jul. 18, 2023

(54) EFFICIENT MULTI-PATH ROUTING FLOW PROVISIONING TELEMETRY IN PROTOCOL INDEPENDENT MULTICAST

(71) Applicant: Cisco Technology, Inc., San Jose, CA (US)

(72) Inventors: Rishi Chhibber, Dublin, CA (US); Roshan Lal, San Jose, CA (US); Padmanab Pathikonda, Mountain House, CA (US); Francesco Meo, San Jose, CA (US); Ramakrishnan Chokkanathapuram Sundaram, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/232,848

(22) Filed: Apr. 16, 2021

(65) Prior Publication Data
US 2022/0337441 A1 Oct. 20, 2022

(51) Int. Cl.
*H04W 4/00* (2018.01)
*H04L 12/18* (2006.01)
*H04L 45/24* (2022.01)

(52) U.S. Cl.
CPC .............. *H04L 12/18* (2013.01); *H04L 45/24* (2013.01)

(58) Field of Classification Search
CPC ...... H04L 12/18; H04L 45/24; H04L 12/1886
See application file for complete search history.

(56) References Cited

U.S. PATENT DOCUMENTS

| | | | | |
|---|---|---|---|---|
| 5,852,407 A | * | 12/1998 | Ishii | G06F 15/17393 340/2.21 |
| 6,973,023 B1 | * | 12/2005 | Saleh | H04L 41/12 370/254 |
| 8,891,513 B1 | * | 11/2014 | Huang | H04L 49/253 370/352 |
| 2004/0205215 A1 | * | 10/2004 | Kouvelas | H04L 45/60 370/351 |
| 2004/0208549 A1 | * | 10/2004 | Rutledge | H04L 41/044 398/50 |
| 2006/0146857 A1 | * | 7/2006 | Naik | H04L 12/1428 370/432 |
| 2007/0153683 A1 | * | 7/2007 | McAlpine | H04L 43/00 370/249 |
| 2011/0211578 A1 | | 9/2011 | Zwiebel et al. | |
| 2012/0188909 A1 | | 7/2012 | Previdi et al. | |

(Continued)

*Primary Examiner* — Atique Ahmed
(74) *Attorney, Agent, or Firm* — Lee & Hayes, P.C.

(57) ABSTRACT

This disclosure describes techniques for improved multicast network telemetry implemented over multilayer switches in a PIM domain. The multilayer switches may be configured to collectively certify end-to-end flow provisioning, and to publish telemetry data certifying flow provisioning from a single notifier to an external controller host. Computational workload and network traffic for streaming data related to certifying path provisioning is kept to a minimum for each flow that needs to be certified, which also keeps compounding of network traffic for many different flows to a minimum. Moreover, since controller hosts are notified upon successful provisioning but not at other times, controller hosts can trust that the telemetric data is minimally latent, and may be relied upon to enact timely actions which produce desired outcomes.

17 Claims, 18 Drawing Sheets

(56) References Cited

U.S. PATENT DOCUMENTS

| | | |
|---|---|---|
| 2013/0322231 A1 | 12/2013 | Csaszar et al. |
| 2014/0362678 A1* | 12/2014 | Koh ................. H04L 49/557 |
| | | 370/216 |
| 2017/0093612 A1* | 3/2017 | Singh ............... H04L 41/0654 |
| 2018/0098320 A1 | 4/2018 | Gan et al. |
| 2019/0007225 A1 | 1/2019 | Nagarajan et al. |

* cited by examiner

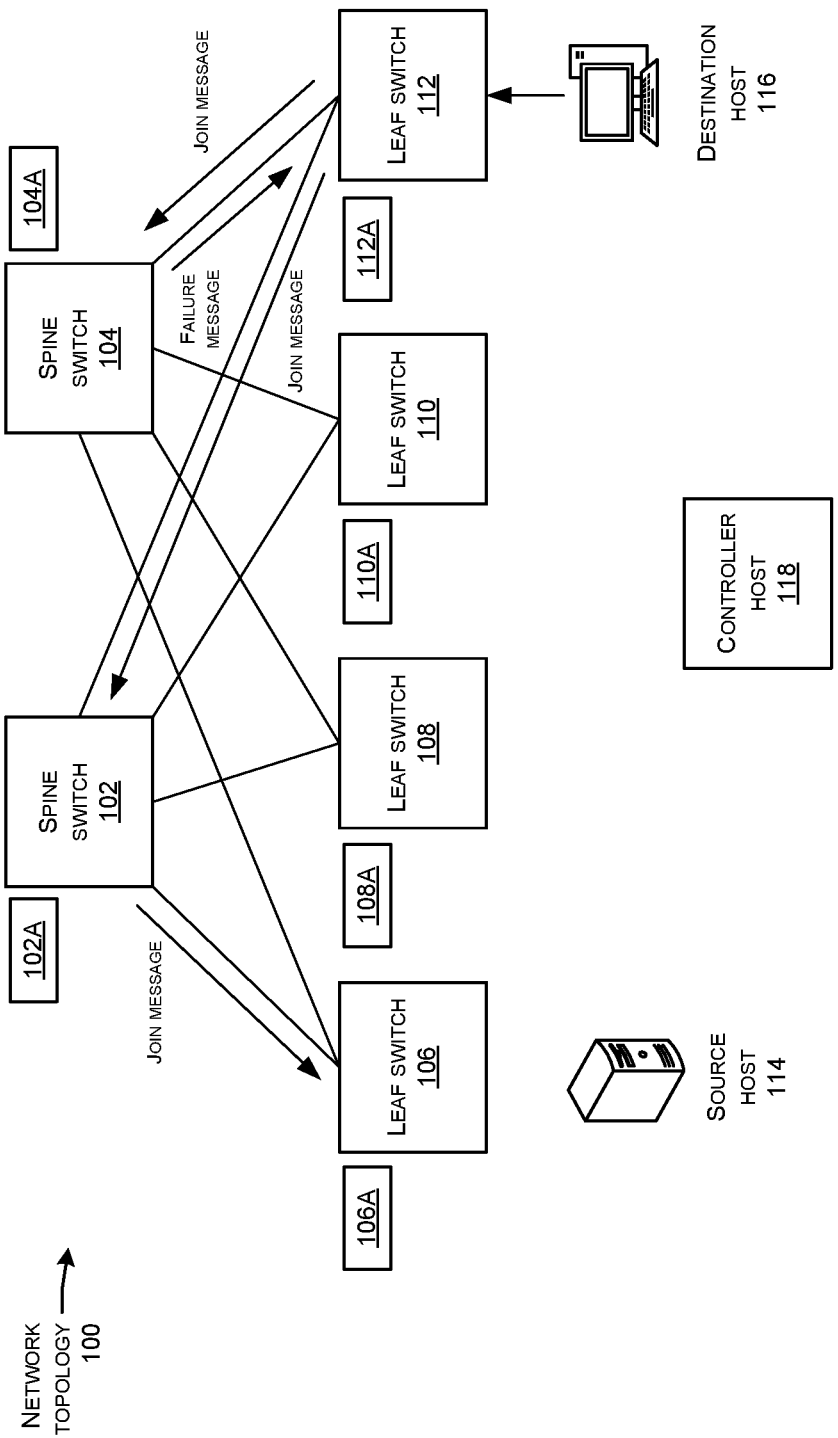

EFFICIENT MULTI-PATH ROUTING FLOW PROVISIONING TELEMETRY IN PROTOCOL INDEPENDENT MULTICAST

TECHNICAL FIELD

The present disclosure relates generally to improving network telemetry in Protocol Independent Multicast implementing multi-path routing, by implementing efficient notification of flow provisioning success from a single notifier in the network topology.

BACKGROUND

Multicast is a concept utilizing Internet Protocol ("IP")-based networking to address network traffic, in the form of IP packets, from a source host to multiple destination hosts. Multicast is conducted based on defining a group made up of source hosts and destination hosts. In multicast, routers and/or multilayer switches on paths of one or more networks connecting each source host to each destination host are relied upon to forward multicast packets in accordance with a distribution tree connecting each source host to each destination host. By forwarding multicast packets according to the tree structure branching out from a source host, routers and/or multilayer switches may cause multicast packets to be propagated to multiple destination hosts without that source host sending multiple packets over the network, alleviating network load and improving packet forwarding efficiency.

Hosts may establish their membership in a group (based on interest in receiving multicast traffic) by one of various multicast protocols, such as versions of Internet Group Management Protocol ("IGMP"). However, whereas protocols such as IGMP are implemented at local network domains encompassing a host and a local router, multicast traffic generally passes through other network domains over any number of other private networks, public networks, and the Internet. On routers and/or multilayer switches in these domains, rather than implementing a specific multicast protocol, Protocol Independent Multicast ("PIM") is instead implemented. PIM, as a standalone protocol, provides operations which correspond to analogous operations defined in protocols such as IGMP. Routers and/or multilayer switches implementing PIM and storing distribution tree data establish interoperability with specific multicast protocols such as IGMP in order to interconnect the operation of multicast across many local networks implementing different multicast protocols.

Various multi-path routing protocols may be implemented to configure routers and/or multilayer switches to collectively try multiple possible routing paths. In this context, "flow provisioning" generally refers to the successful establishment of any one of multiple possible routing paths among routers and/or multilayer switches from a destination host to a source host. For example, flow provisioning may be implemented by equal-cost multi-path ("ECMP") routing, wherein switches of a multicast group establish the flow of IP packets by forwarding a join message in reverse, selecting from among multiple possible paths at each hop in order to balance load of traffic. While flow provisioning processes such as ECMP have gradually gained adoption among network administrators, the decentralized nature of flow provisioning means that such traffic engineering techniques do not notify users at a source host that a path from the source host to the destination host has been successfully routed.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2A and FIG. 2B illustrate two possible outcomes of flow provisioning for a same source host in the network topology.

DESCRIPTION OF EXAMPLE EMBODIMENTS

Overview

Figure 1:
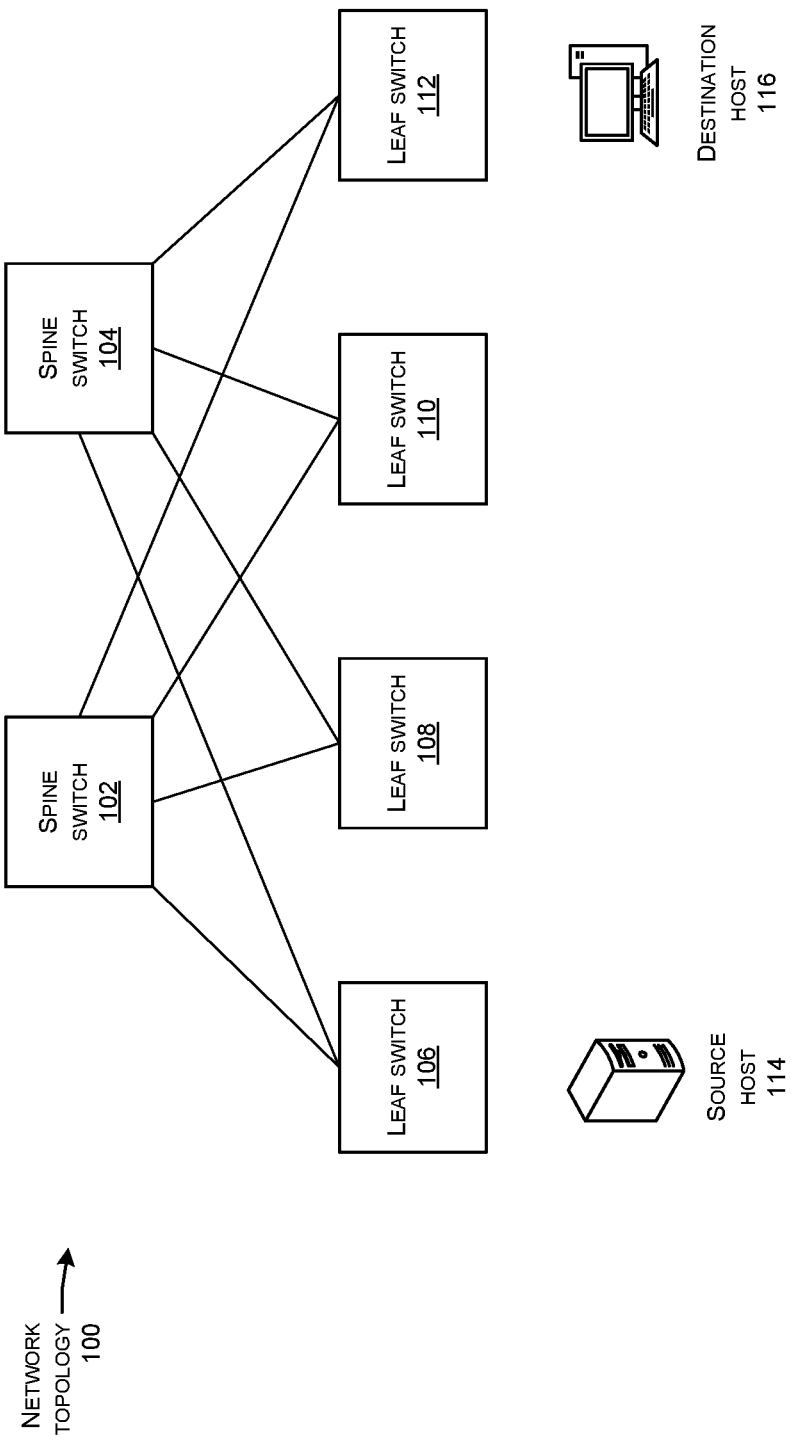
FIG. 1 illustrates a diagram of a network topology shown in part to illustrate example embodiments of the present disclosure.

This disclosure describes techniques for improved multicast network telemetry implemented over multilayer switches in a PIM domain. A method includes comparing, by a switch of a Protocol Independent Multicast ("PIM") domain, each interface of the switch to certified path information of the PIM domain; determining, by the switch, that a first egress interface of the switch is a fabric interface of the certified path information; and forwarding, by the switch, a downstream certifying message over the first egress interface, the downstream certifying message comprising the certified path information.

The method further includes composing, by the switch, the downstream certifying message, the downstream certifying message further comprising an identifier of the switch and an identifier of a certified ingress interface of the switch. The method further includes setting, by the switch, a flow-certifying flag of the certified ingress interface of the switch to a positive value. The method further includes receiving, by the switch, the downstream certifying message over an ingress interface of the switch. The method further includes determining, by the switch, that a second egress interface of the switch has a last hop router flag set to a positive value. The method further includes publishing, by the switch, the certified path information for a controller host outside the PIM domain according to a telemetry framework.

Additionally, another method includes receiving, by a switch of a PIM domain, a PIM join message over an egress interface of the switch; determining, by the switch, a first next hop over a first ingress interface towards a source host according to a multi-path routing protocol; determining, by the switch, a second next hop over a second ingress interface towards the source host; and forwarding, by the switch, a downstream certifying message over the egress interface, the downstream certifying message comprising the second ingress interface and not comprising the first ingress interface.

Additionally, the techniques described herein may be performed by a system and/or device having non-transitory computer-readable media storing computer-executable instructions that, when executed by one or more processors, performs the methods described above.

Example Embodiments

Protocol Independent Multicast ("PIM") is implemented over routers and/or multilayer switches in a network domain (described herein as a "PIM domain" for ease of reference) to enable forwarding of multicast packets over one or more networks from any number of source hosts belonging to a multicast group to any number of destination hosts belonging to the multicast group. Relative positions of network nodes including a source host, a destination host, and any multicast router and/or multilayer switch located in a PIM domain on a path between the source host and the destination host may be defined according to the direction of transport of the multicast packets as upstream (that is, located any number of network hops towards the source host) or downstream (that is, located any number of network hops towards the destination host). Multicast packets should be transported from upstream network nodes to downstream network nodes.

A destination host may send a request to a multicast group indicating the destination host's interest in receiving multicast traffic from a source host of the multicast group. The request may be sent in accordance with any specific multicast protocol, such as Internet Group Management Protocol ("IGMP"). Regardless of the specific multicast protocol, when the request is transported to a multicast switch in a PIM domain, the request may be translated to a join message according to PIM. A join message according to PIM may indicate that a destination host reachable through a multicast router or multilayer switch, that is, a destination host "behind" the multicast router or multilayer switch, has interest in multicast traffic from a source host of a particular multicast group and therefore is requesting to join the multicast group.

According to various implementations of PIM, such as Dense Mode, Sparse Mode, and the like, a multicast router and/or multilayer switch may build a distribution tree based on the join message. A distribution tree according to PIM may be notated (S, G), where G denotes a multicast group, and S denotes a particular source host of the multicast group. According to shortest path tree ("SPT") source trees as implemented by PIM, a multicast group may include multiple SPTs (S, G), where G is constant but each S is a different source host, and different destination hosts may receive multicast traffic each from a different source host by a different SPT. Alternatively, a distribution tree according to PIM may be notated (*, G), where G denotes a multicast group, but multiple source hosts may each direct multicast traffic to a common root of one SPT shared tree, and all destination hosts receive multicast traffic from this common root over the same shared tree.

Since each multicast router or multilayer switch of the PIM domain will ultimately store path information for multiple distribution trees, such distinct distribution trees may be subsequently notated (S1, G1), (S2, G2), and so on for the sake of distinction.

Regardless of whether a distribution tree built is a source tree or a shared tree, multicast routers and/or multilayer switches located in a PIM domain may build a distribution tree by applying reverse path forwarding ("RPF") to routing tables stored at the multicast routers and/or multilayer switches for unicast routing purposes so as to forward the join message to an upstream router or multilayer switch determined to be part of a SPT leading to a source host. Multicast routers and/or multilayer switches along paths of a distribution tree being built may store distribution tree path information which establishes that multicast traffic received over a particular router or switch interface should be forwarded over one or more router and/or switch interfaces. Since join messages are forwarded in a downstream-upstream direction, in the direction of source hosts, distribution tree path information may be stored first at multicast routers and/or multilayer switches located nearest leafs of the distribution tree, and subsequently at multicast routers and/or multilayer switches located nearer a root of the distribution tree.

For example, the multicast router or multilayer switch may determine, by comparing a source host specified by a join message and a router or switch interface on which the join message was received with unicast routing tables, whether the multicast router or multilayer switch is on a shortest path from the specified source host to the destination host (that is, by unicast routing algorithms as known in the art, the router or switch has already determined that it is on a shortest path for forwarding unicast packets from the source host to the destination host, and stored that path information locally in unicast routing tables). In the event that the source host and the router or switch interface match an entry in the unicast routing tables, the multicast router or multilayer switch may forward the join message upstream to an upstream network node thus identified as part of the shortest path.

According to example embodiments of the present disclosure, example network topologies include at least a source host behind any first multilayer switch in a PIM domain, and a destination host behind any second multilayer switch in the PIM domain. Additionally, according to example embodiments of the present disclosure, a controller host is implemented external to the PIM domain. The controller host, without being part of the flow of any switches of the PIM domain, may have an open control connection with each of the hosts of the PIM domain and each of the multilayer switches of the PIM domain.

Each of the multilayer switches of the PIM domain may be configured according to a telemetry framework such that the respective switch may publish locally stored path information to the controller host by the control connection between the respective switch and the controller host. The controller host may be configured to receive published information from each multilayer switch according to the telemetry framework. In this manner, the controller host may be configured to aggregate telemetric data regarding flows in the network for centralized analysis by network administrators and by automated networks analytic tools. Such analytics may provide basis for automated or manual actions to troubleshoot and resolve network failures, performance degradation, and the like. However, actionable analysis of network telemetry requires the controller host to receive up-to-date telemetric data in real time.

In flow provisioning, a flow from a source host to a destination host is successfully provisioned upon some number of multilayer switches of a PIM domain storing respective path information which collectively describes an end-to-end path from the source host to the destination host over some number of multilayer switches, by applying RPF to path information stored at each switch as described above. Conventionally, flow provisioning processes do not establish procedures wherein a controller host is notified upon successful provisioning of an end-to-end path. However, since it is desired to determine whether flow provisioning has been successful or not as part of network telemetry analysis, some solutions have been developed as known to persons skilled in the art.

For example, conventionally, multilayer switches may be configured to, upon storing path information locally, publish the path information to the controller host. Furthermore, conventionally, the controller host may be configured according to the telemetry framework to receive the published path information over some number of open data streams, and compiled the published path information to determine whether an end-to-end path is provisioned.

According to such conventional solutions for notifying a controller host of path provisioning success, multilayer switches must periodically stream data to the controller host, resulting in a non-negligible increase in computational workload and network traffic. Moreover, since many flows may need to be provisioned through a single network domain at a time, such computational and network overheads become compounded by increased network traffic. While such overheads may be alleviated by reducing frequency of the data publishing, less frequent publishing, in turn, results in latency in telemetric data at controller hosts. In practice, such latency may delay telemetric data by up to two minutes. Such latent telemetric data may result in analysis of flow provisioning becoming confounded, leading to actions which produce undesired outcomes.

Thus, example embodiments of the present disclosure provide improved multicast network telemetry implemented over multilayer switches in a PIM domain. The multilayer switches may be configured to collectively certify end-to-end flow provisioning, and to publish telemetry data certifying flow provisioning from a single notifier to an external controller host.

FIG. 1 illustrates a diagram of a network topology 100 shown in part to illustrate example embodiments of the present disclosure. For the purpose of understanding the present disclosure, it should be appreciated that the elements of the network topology 100 as shown in FIG. 1 and in each subsequent diagram are not limited to those shown, and such network topologies may encompass any number of other elements not illustrated herein. In such manners, parts of each network topology not relevant to understanding the present disclosure have been omitted or simplified. Moreover, subsequent figures of the present disclosure may illustrate network topologies analogous to those illustrated in FIG. 1, wherein elements having common numbering across each figure may be referenced by the common numbering to indicate that they perform similar functions within the context of those figures.

According to a network topology 100 as partially illustrated in FIG. 1, the network topology 100 may include some number of multicast routers and/or multilayer switches, the routers and/or switches being arranged in a spine-leaf architecture, including some number of leaf switches implemented as access points to the PIM domain, wherein traffic is primarily routed through spine routers and/or switches making up the spine. Each spine router and/or switch is in communication with each leaf switch by a network segment of the PIM domain.

Thus, switches making up the network topology 100 may be multilayer switches, configured to operate both in layer 2 and layer 3 of the PIM domain according to the Open Systems Interconnection ("OSI") model: in layer 2, leaf switches may receive join messages over a physical interface, and replicate the join messages over some number of network segments to each spine router and/or switch. In layer 3, spine switches may build path information, forward join messages, and apply RPF to path information, as described above.

For the purpose illustration, network topology 100 is illustrated including spine switch 102 and spine switch 104, as well as leaf switches 106, 108, 110, and 112. It should be understood that this does not exclude any number of additional non-illustrated spine routers and/or switches (which may be equivalent in function to the illustrated spine switches), and any number of other non-illustrated leaf switches (which may be equivalent in function to the illustrated leaf switches), from the network topology.

Each of the spine switches and the leaf switches may store respective path information such as routing tables. The path information of each respective spine switch and leaf switch is subsequently designated 102A, 104A, 106A, 108A, 110A, and 112A, correspondingly. Each respective path information shall be described in more detail subsequently.

By implementing a spine-leaf architecture, the network topology 100 services multicast traffic for some number of hosts, each source host and each destination host being behind a multilayer switch. Hosts may access the PIM domain by respective connections to leaf switches over network segments of a local area network ("LAN"), of a wide area network ("WAN"), of a virtual local area network ("VLAN"), of a multicast virtual private network ("mVPN"), and the like. Consequently, join messages indicating interest in packets from any host connected to the PIM domain (any such host being subsequently described as a "source host 114," without limitation as to the specific identity of the source host) may be routed by at least one spine router or switch of the network topology 100 on a path to the source host indicated in the join message. In this fashion, a spine router or switch may provision a flow for multicast IP packets from the source host 114.

However, not all spine routers and/or switches of the network topology 100 may be able to provision a flow at any arbitrary time. Since computational resources of any arbitrary router and/or switch may be consumed at any arbitrary time by ongoing traffic, especially in large-scale network topologies which may include hundreds of switches, any, some, or all spine routers and/or switches may fail to provision any arbitrary flow. Due to the potentially large number of routers and/or switches in a spine, as well as the potentially substantial volume of IP traffic and join messages being routed by every spine router and/or switch, multi-path routing protocols are implemented so that the routers and/or switches may try any arbitrary number of possible paths before successfully provisioning one path. Thus, it is unpredictable as to which spine router and/or switch may ultimately provision any arbitrary flow for packets from a source host 114.

Figure 2B:
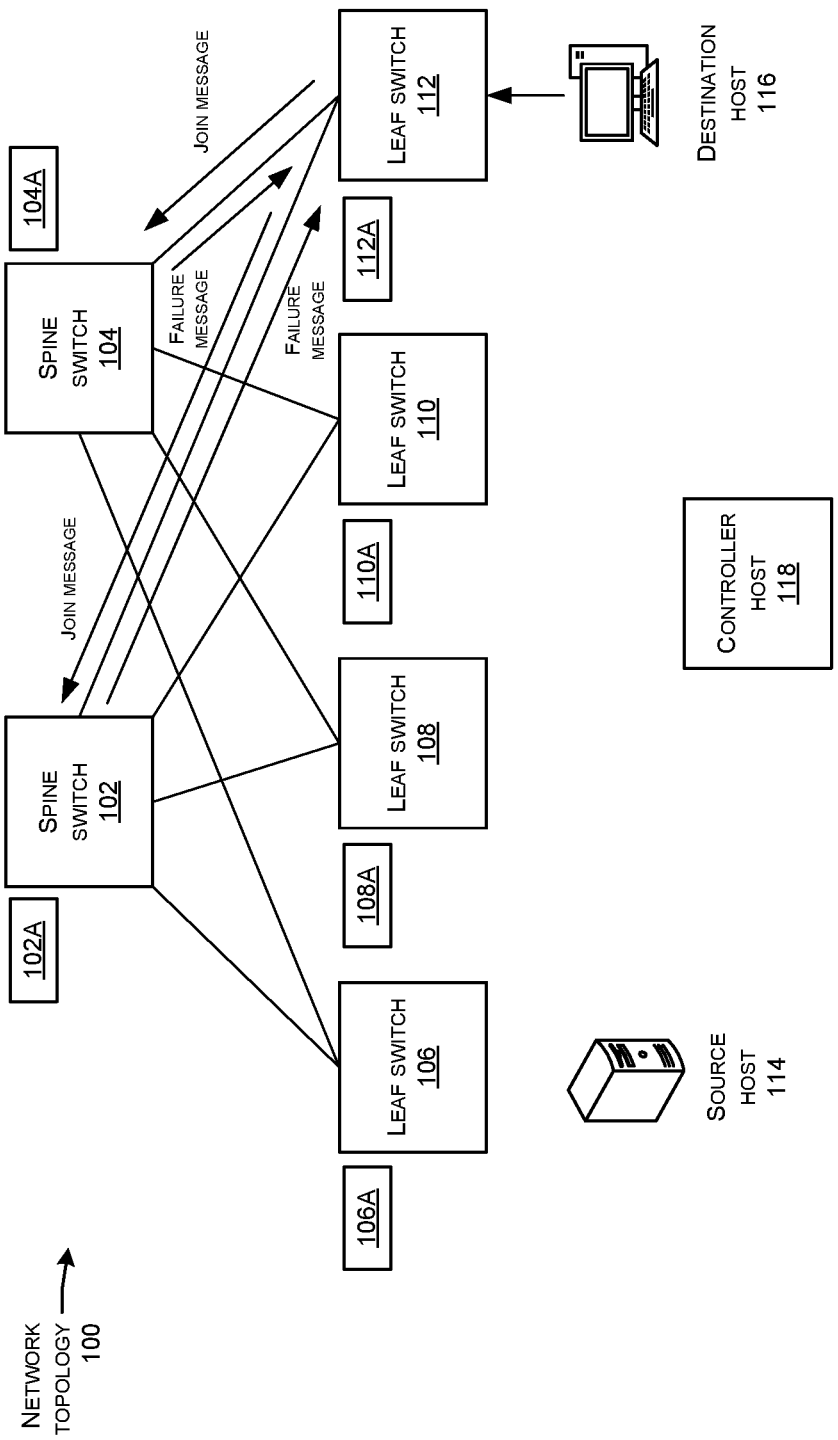

FIG. 2A and FIG. 2B illustrate two possible outcomes of flow provisioning for a same source host 114 in the network topology 100. As illustrated in both FIG. 2A and FIG. 2B, a destination host accesses the PIM domain by connecting to an interface of the leaf switch 112. The destination host forwards a join message indicating interest in receiving multicast IP traffic from the source host 114 of the PIM domain, as described above, to the leaf switch 112, whereupon the leaf switch 112 may forward the join message from an interface to one or more spine switches, and may replicate the join message as necessary to forward the join message.

The destination host may be any host connected to the PIM domain (any such host being subsequently described as a "destination host 116," without limitation as to the specific identity of the destination host).

FIG. 2A illustrates a first possible outcome, in which the leaf switch 112 first forwards the join message to an interface of the spine switch 102. The spine switch 102 is unable to provision a flow from the source host 114 for any arbitrary reason (such as insufficient computational resources at the spine switch 102). Therefore, according to multi-path routing protocol, such as, by way of example, equal-cost multipath ("ECMP") routing, the spine switch 102 may return a failure message to the leaf switch 112 indicating that the spine switch 102 failed to provision a flow from the source host 114. For example, according to ECMP routing, the failure message may be implemented as a REDIRECT message as defined in Internet Engineering Task Force ("IETF") Request for Comments ("RFC") 6754, "Protocol Independent Multicast Equal-Cost Multipath (ECMP) Redirect."

Upon receiving the failure message, the leaf switch 112 then forwards the join message to an interface of the spine switch 104. The spine switch 104 is able to provision a flow from the source host 114. Therefore, according to multi-path routing protocol, such as, by way of example, ECMP routing, the spine switch 104 may forward the join message from an interface to the leaf switch 106, and the leaf switch 106 may forward the join message to the source host 114 behind the leaf switch 106.

Thereafter, the spine switches of the PIM domain, collectively, have successfully provisioned a flow from the source host 114; however, conventional multi-path routing protocols such as ECMP provide no mechanism for a controller host 118, outside the PIM domain, to be notified immediately and directly that the spine switches have successfully provisioned the flow. As mentioned above, the controller host 118 may periodically receive streamed data from the switches, resulting in a non-negligible increase in computational workload and network traffic. Moreover, latency in publishing this telemetric data may result in analysis of flow provisioning becoming confounded, leading to actions which produce undesired outcomes.

FIG. 2B illustrates a second possible outcome, in which the leaf switch 112 first forwards the join message to an interface of the spine switch 102. The spine switch 102 is unable to provision a flow to the destination host 116 for any arbitrary reason. Therefore, according to multi-path routing protocol, such as, by way of example, ECMP routing, the spine switch 102 may return a first failure message to the leaf switch 112 indicating that the spine switch 102 failed to provision a flow from the source host 114.

Upon receiving the failure message, the leaf switch 112 then forwards the join message to an interface of the spine switch 104. The spine switch 104 is also unable to provision a flow from the source host 114 for any arbitrary reason, which may be a same or different reason as for spine switch 102. Therefore, according to multi-path routing protocol, such as, by way of example, ECMP routing, the spine switch 104 may return a second failure message to the leaf switch 112 indicating that the spine switch 104 failed to provision a flow from the source host 114.

Thereafter, the spine switches 102 and 104 of the PIM domain, collectively, have failed to provision a flow from the source host 114; furthermore, the above may continue for other spine switches, and all spine switches of the PIM domain, collectively, may ultimately fail to provision a flow from the source host 114. However, conventional multi-path routing protocols such as ECMP provide no mechanism for a controller host 118, outside the PIM domain, to be notified immediately and directly that the spine switches have failed to provision the flow. As mentioned above, the controller host 118 may periodically receive streamed data from the switches, resulting in a non-negligible increase in computational workload and network traffic. Moreover, latency in publishing this telemetric data may result in analysis of flow provisioning becoming confounded, leading to actions which produce undesired outcomes.

Figure 3A:
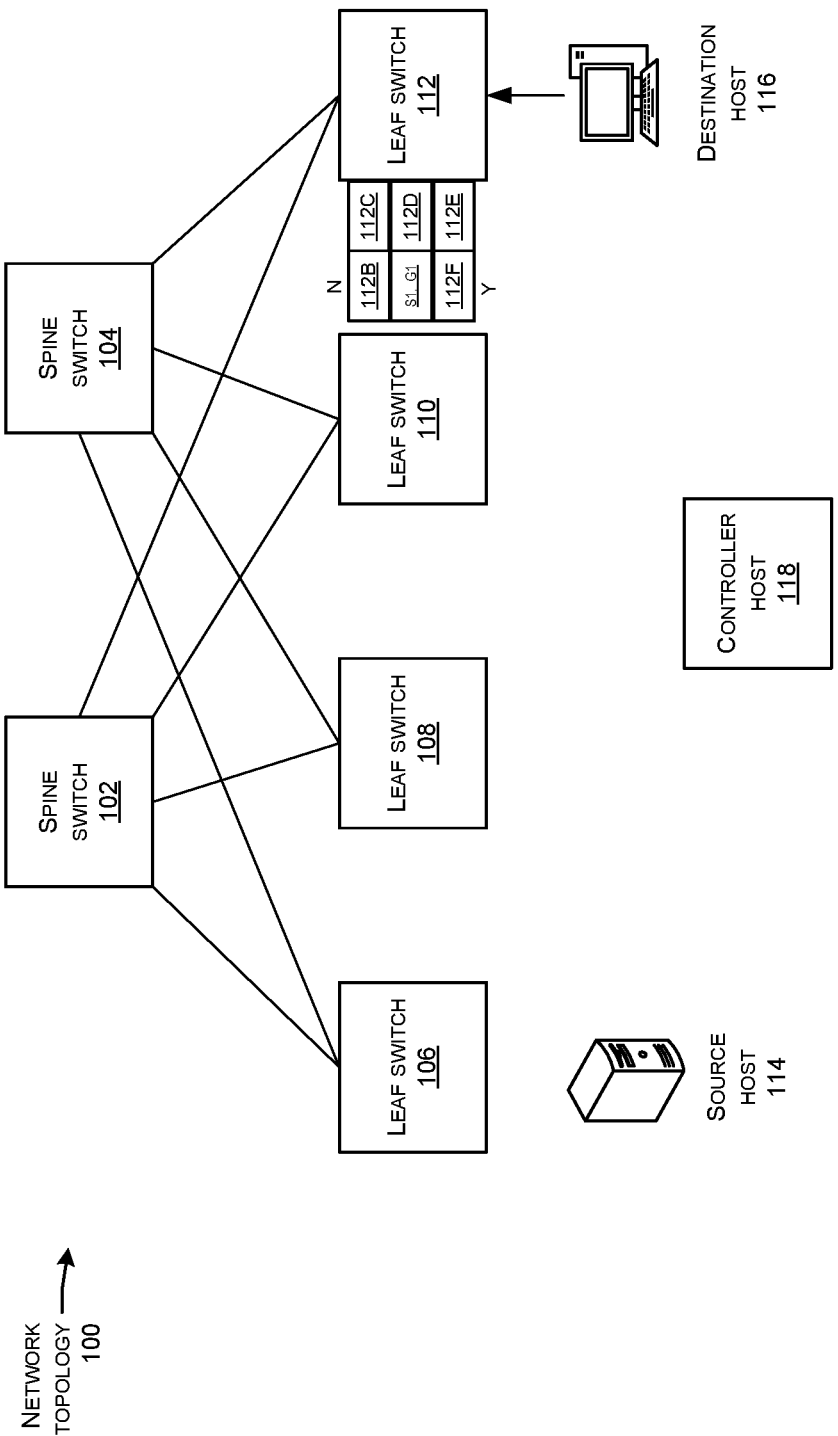
FIGS. 3A through 3H illustrate an example of flow provisioning telemetry in the network topology according to example embodiments of the present disclosure.
Figure 3B:
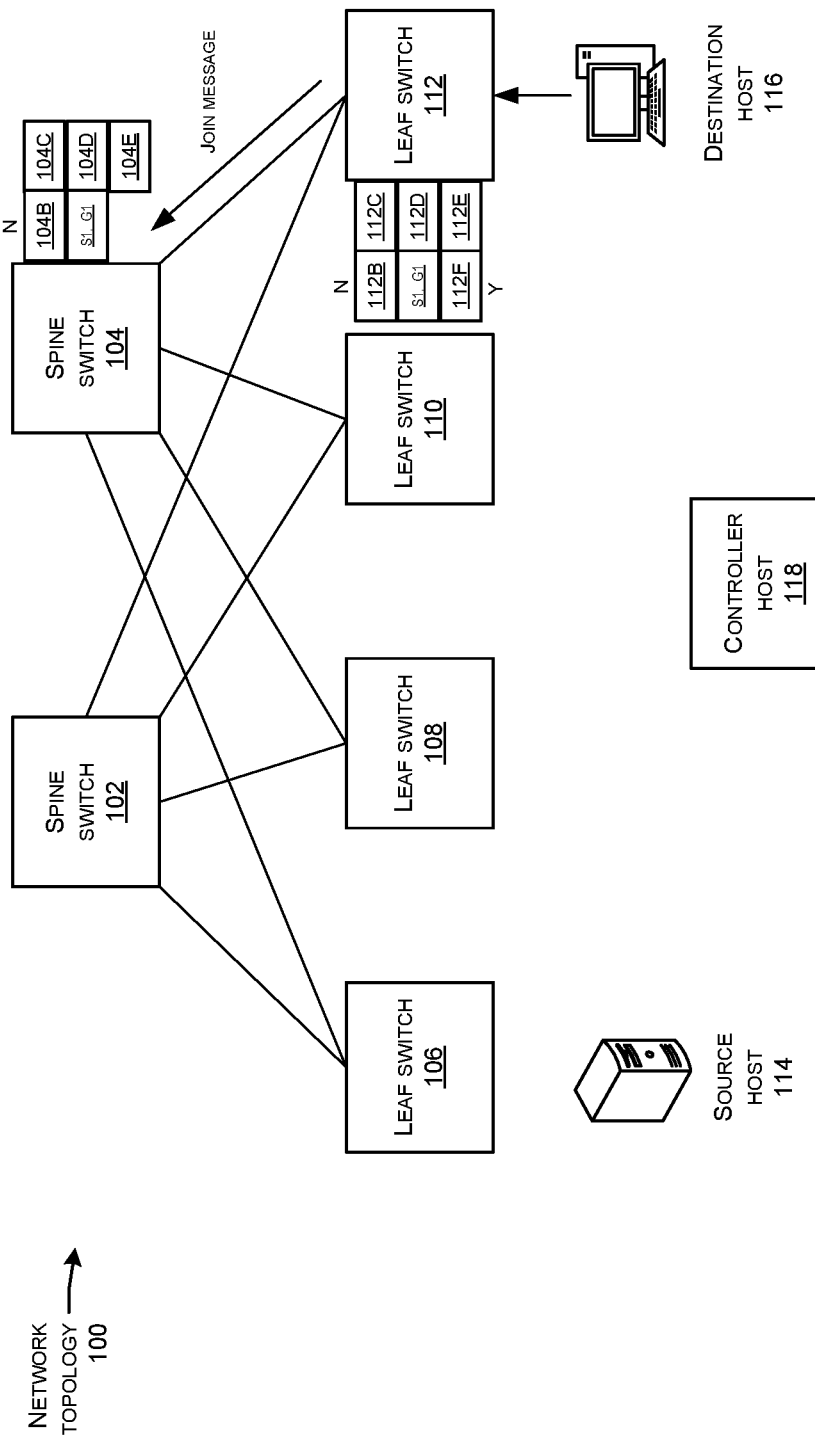
Figure 3C:
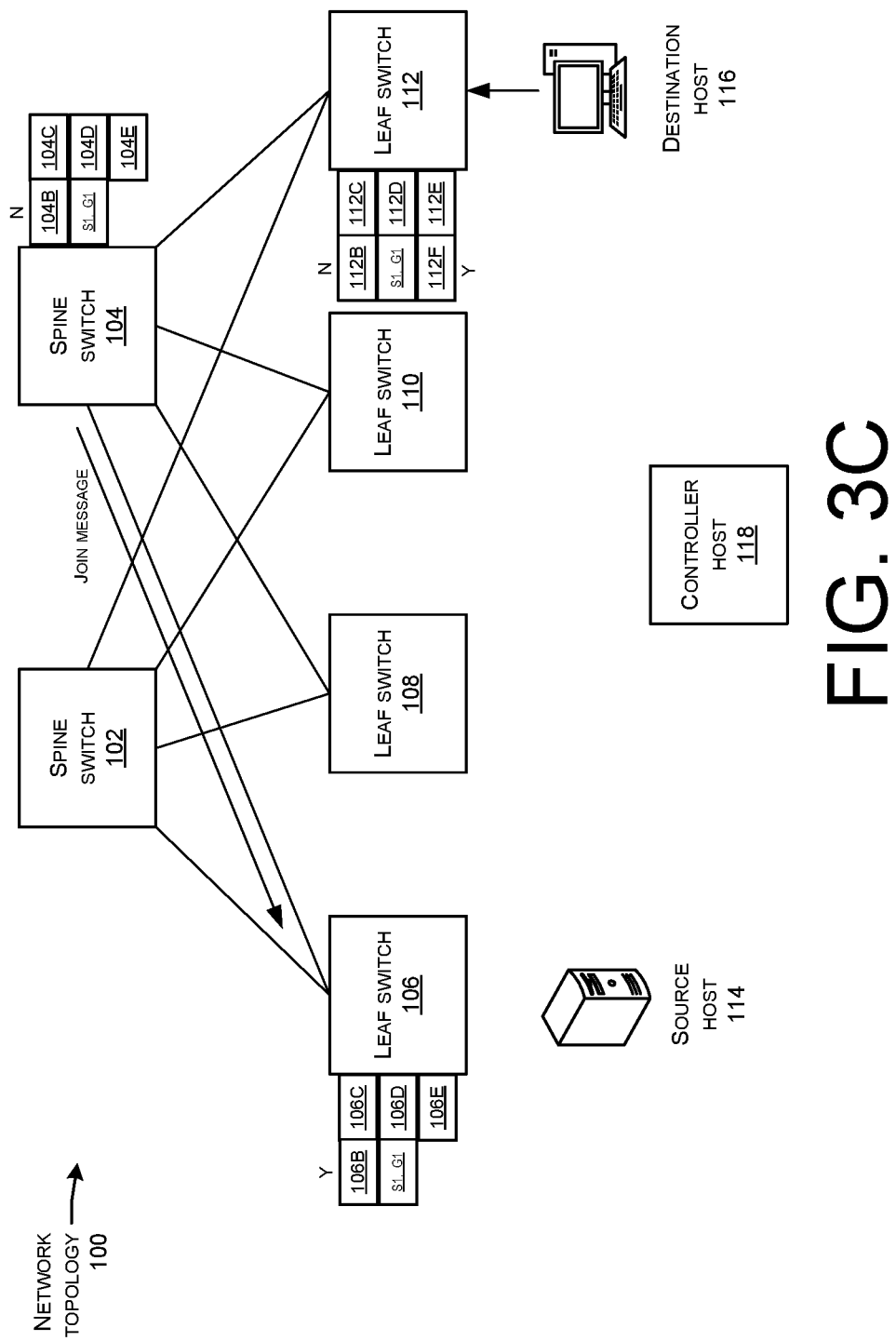
Figure 3D:
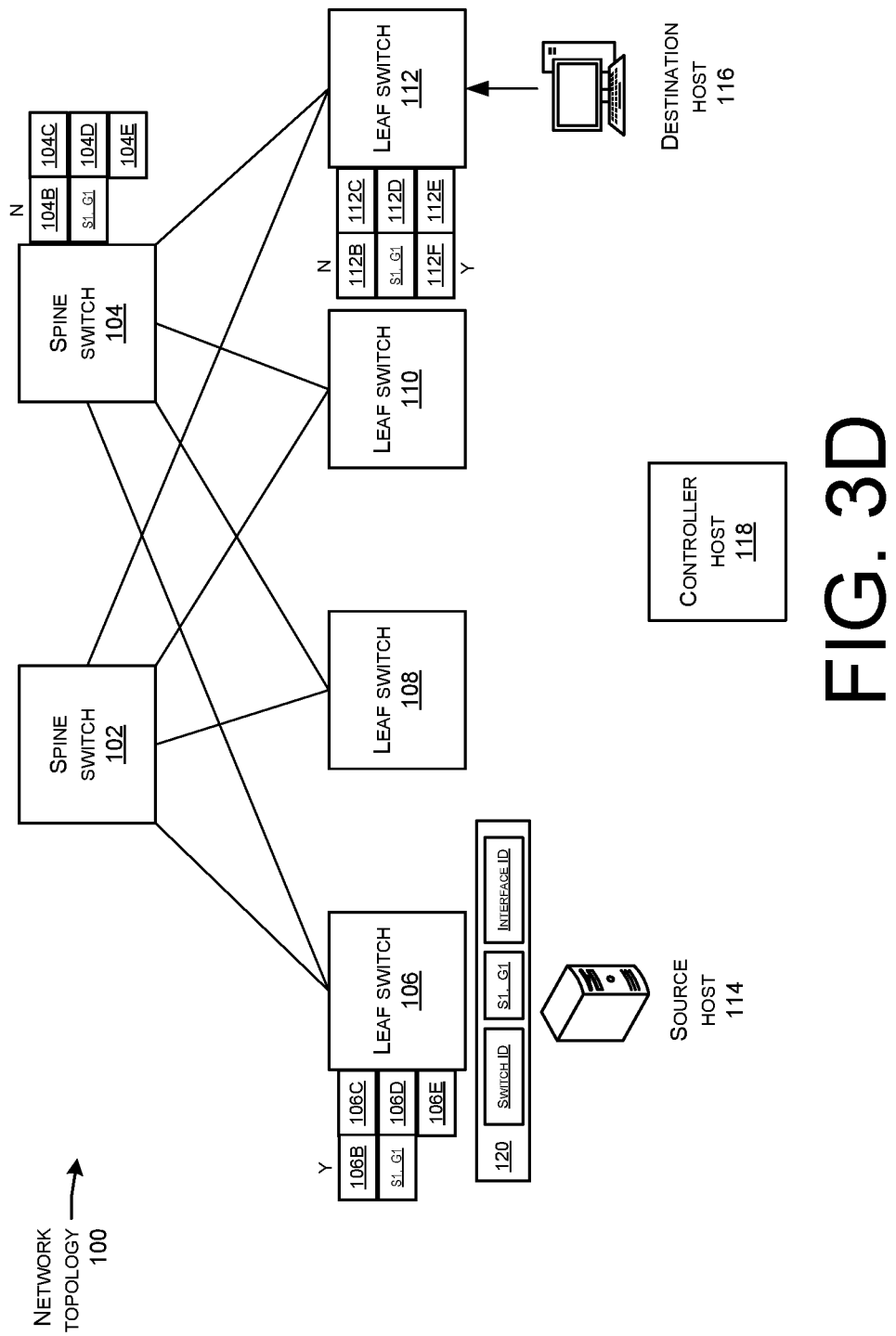
Figure 3E:
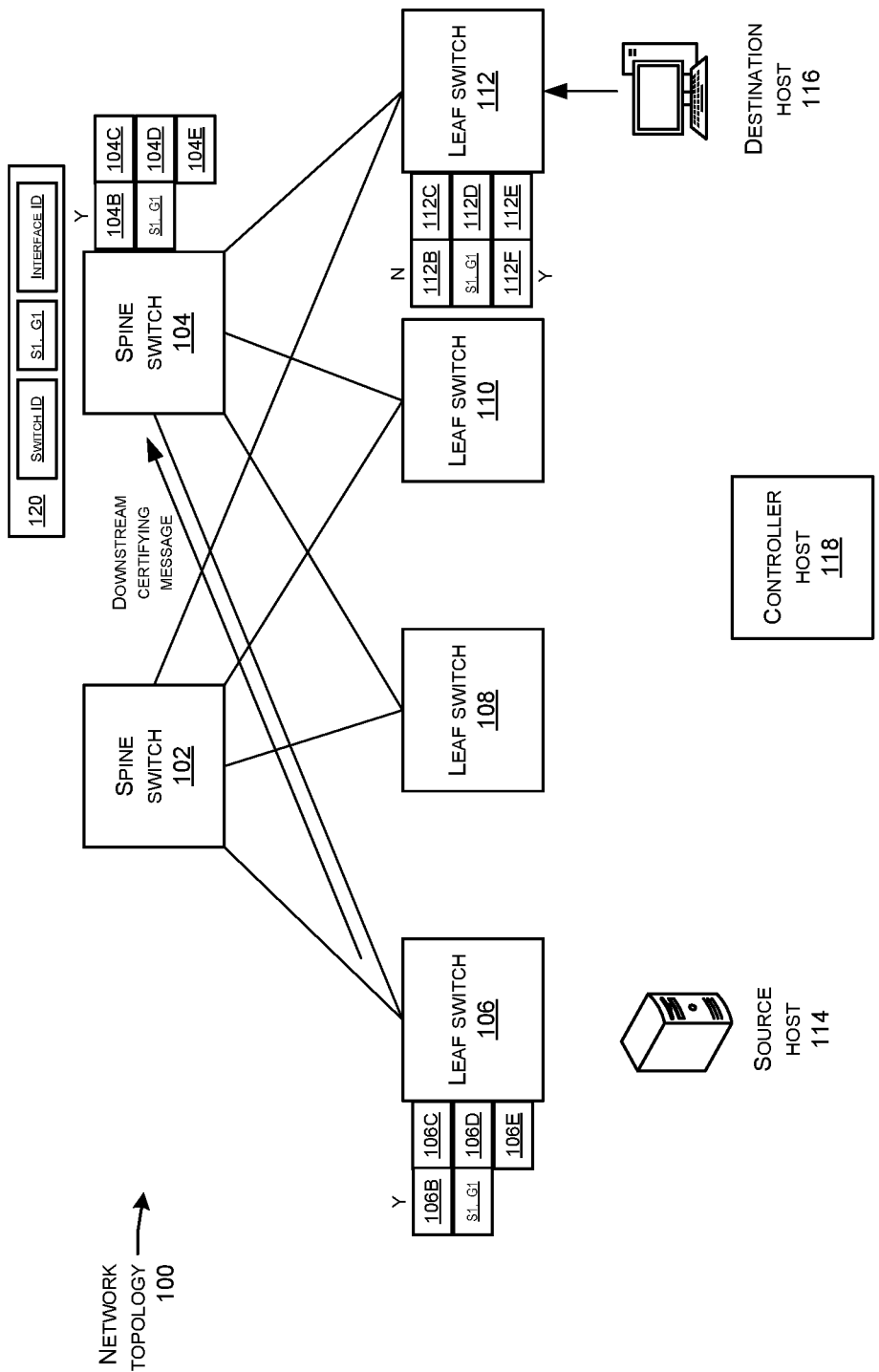
Figure 3F:
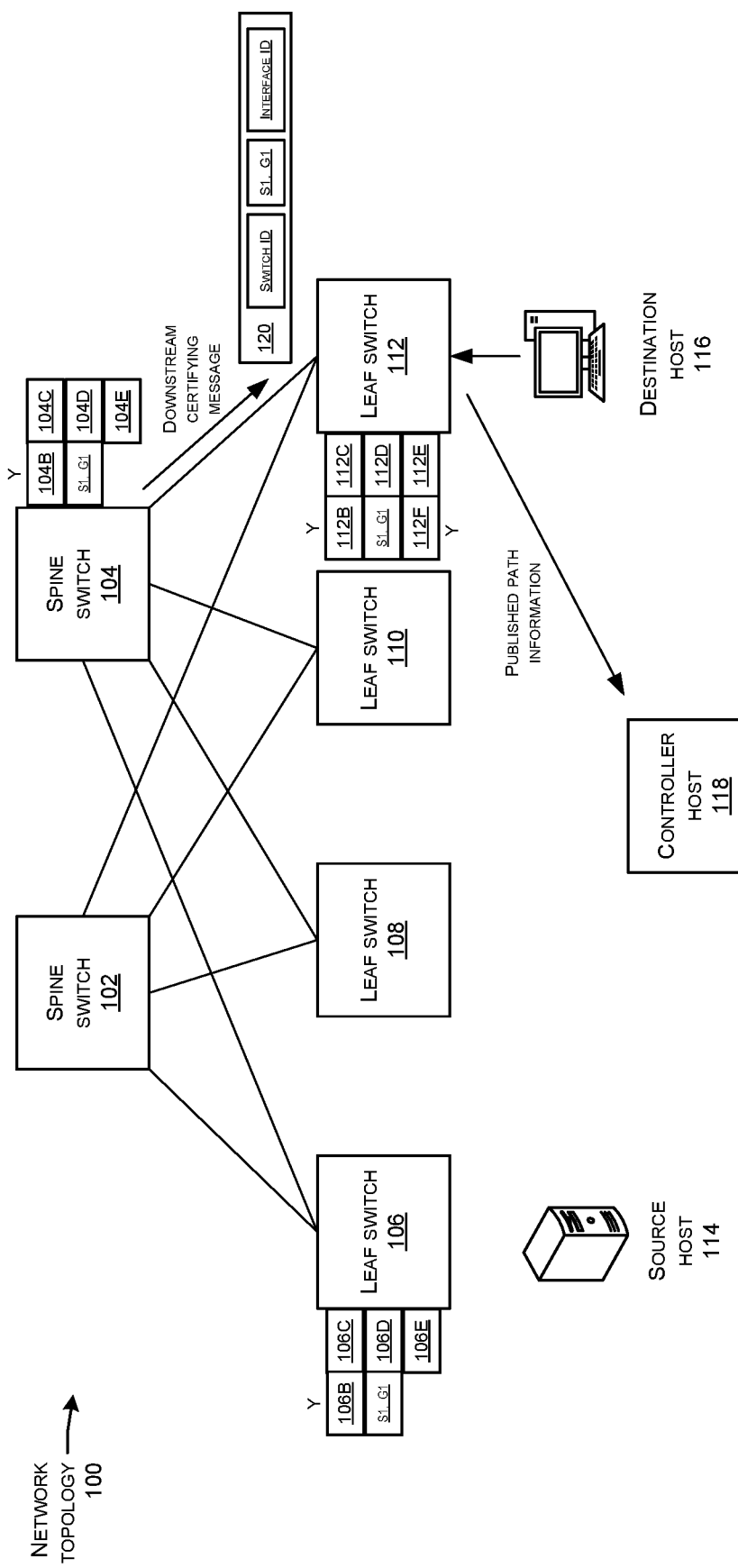
Figure 3G:
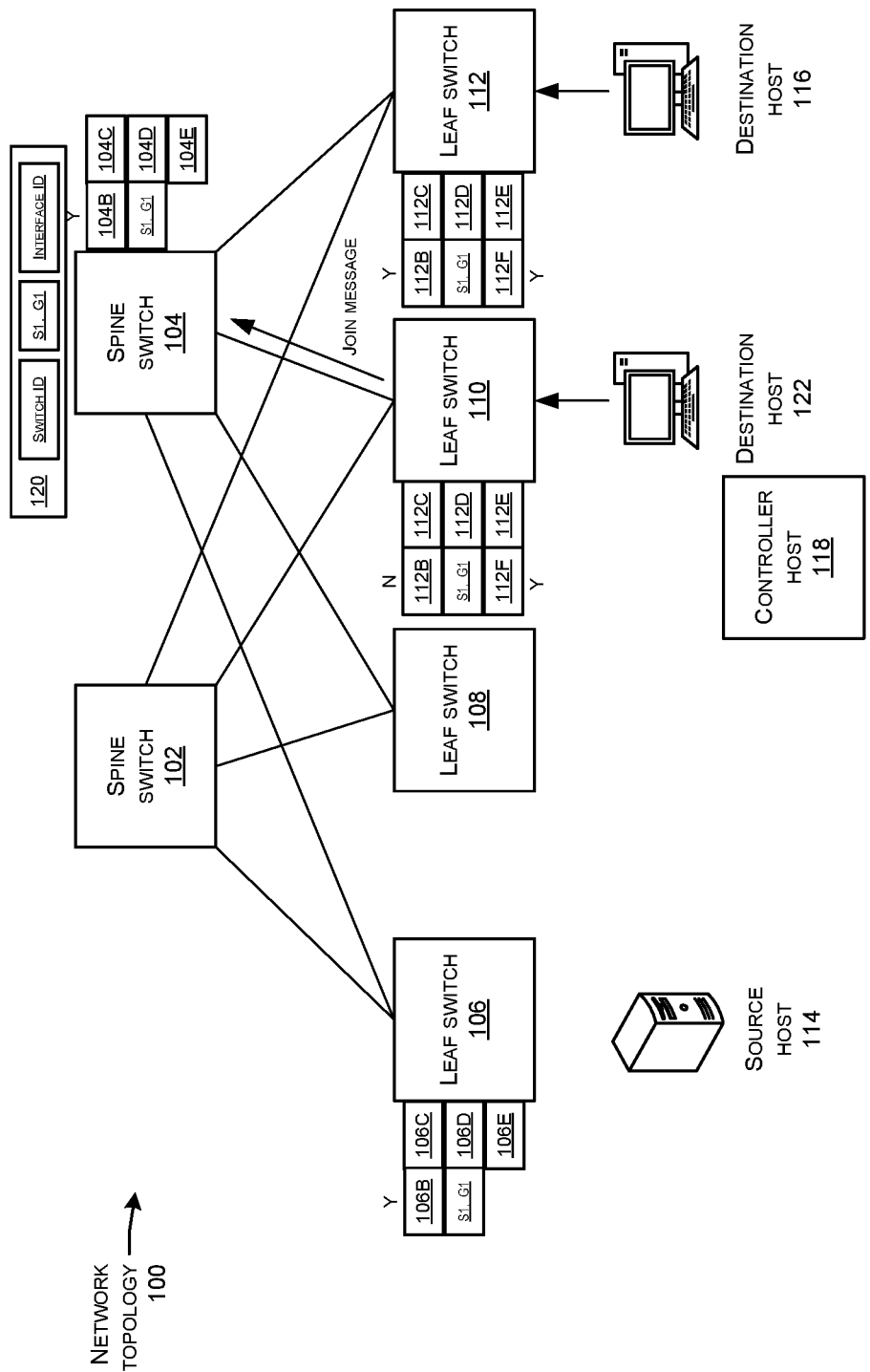
Figure 3H:
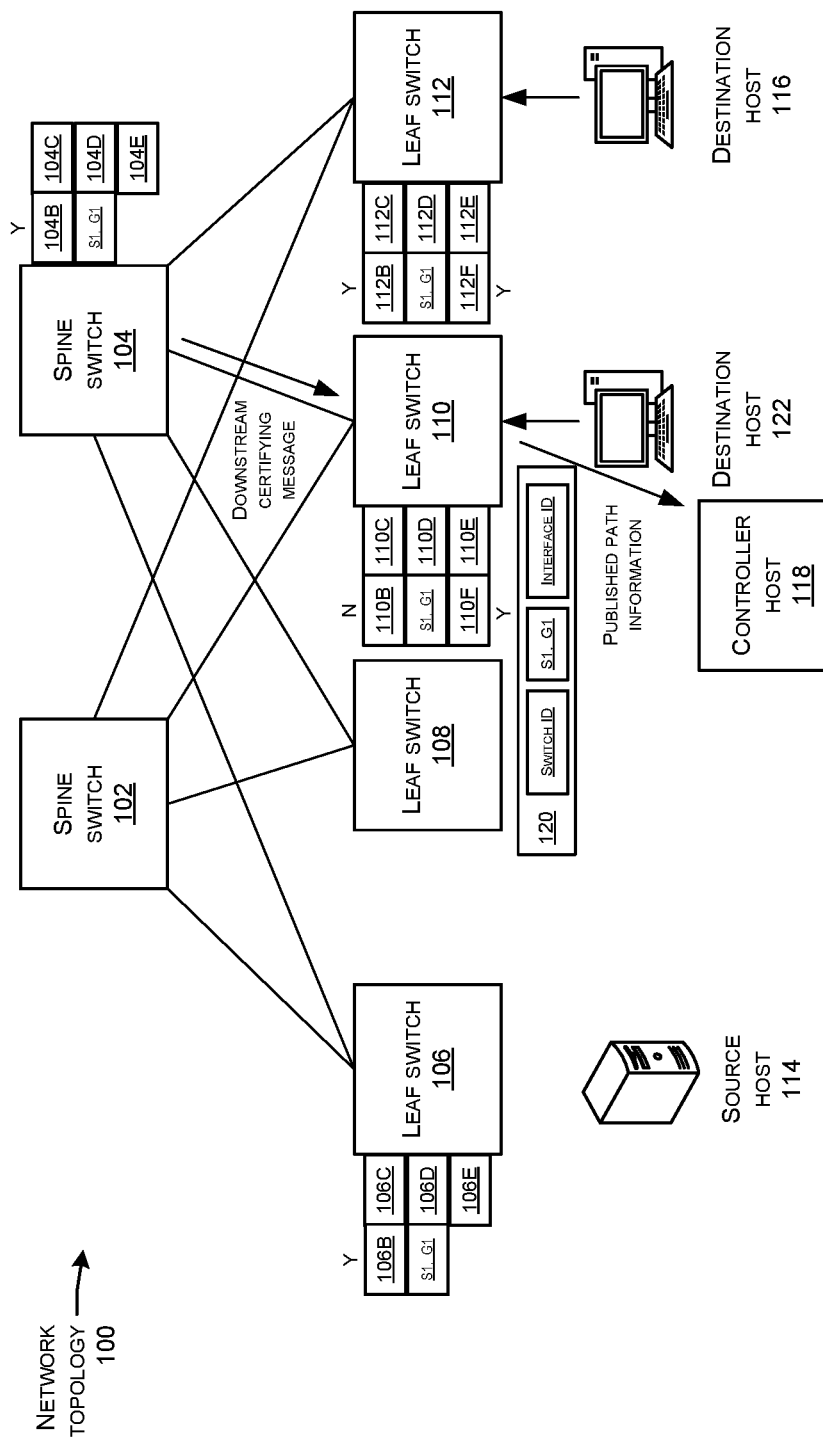

FIGS. 3A through 3H illustrate an example of flow provisioning telemetry in the network topology 100 according to example embodiments of the present disclosure. In contrast to the outcomes illustrated in FIG. 2A and FIG. 2B, wherein switches of a PIM domain successfully provision flows or fail to provision flows, FIGS. 3A and 3H illustrate switches of a PIM domain performing further acts to collectively notify a controller host 118 of flow provisioning telemetry indicating success or failure, from a single notifier in the PIM domain.

FIGS. 3A through 3H illustrate path information 102A, 104A, 106A, 108A, 110A, and 112A in further detail. It may be seen that path information further includes, optionally, respective flow-certifying flags 102B, 104B, 106B, and the like, the purpose of which shall be described subsequently; further includes respective ingress interface lists 102C, 104C, 106C, and the like; further includes respective (S, G) notations 102D, 104D, 106D, and the like, denoting source hosts and multicast groups as described above; further includes respective egress interface lists 102E, 104E, 106E, and the like; and further includes, optionally, respective last hop router ("LHR") flags 102F, 104F, 106F, and the like, the purpose of which shall be described subsequently.

It should be understood that each ingress interface list may include one or more ingress interfaces, each of which may have a flow-certifying flag set to a positive value or a negative value; and each egress interface list may include one or more egress interfaces, each of which may have a LHR flag set to a positive value or a negative value. Subsequently, it should be understood that not every flag of every ingress and every egress interface is relevant to understanding example embodiments of the present disclosure, and that these flags will only be described and illustrated where relevant, and should be understood as being implicitly present as described above even when not described and not illustrated.

FIG. 3A illustrates a destination host 116 joining the PIM group. The destination host 114 connects to an interface of the leaf switch 112 and forwards a join message over the interface, the join message indicating interest in receiving multicast IP packets from a source host 114. The leaf switch 112 references its ingress interface list 112C and egress interface list 112E, and determines that the destination host 116 has connected to an egress interface. The leaf switch 112 sets a LHR flag 112F of the egress interface to a positive value, since this egress interface faces a host.

For the purpose of illustration, the distribution tree established by the join message as it is forwarded upstream is notated (S1, G1).

The leaf switch 112 determines, according to a multi-path routing protocol such as ECMP routing, a next hop towards the source host 114: i.e., which, among its other ingress interface(s) and egress interface(s) provides a best path for forwarding the join message to the source host 114. Procedural details of determining the next hop according to ECMP routing need not be elaborated upon herein for understanding of example embodiments of the present disclosure, but it should be understood that the best path may be a shortest path, or may be one among several shortest paths according to other criteria not reiterated herein. Herein, the leaf switch 112 determines the next hop as being over an ingress interface, and forwards the join message over the ingress interface, which is connected to spine switch 104.

It should be noted that, in FIG. 3A, a flow-certifying flag 112B of the ingress interface of the leaf switch 112 is set to a negative value. This indicates that flow over the ingress interface cannot yet be certified as provisioned.

FIG. 3B illustrates the spine switch 104 receiving the join message over an egress interface. The spine switch 104 does not set any LHR flag, since this egress interface is a fabric interface and does not face any host.

The spine switch 104 determines, according to a multi-path routing protocol such as ECMP routing, a next hop towards the source host 114. Herein, the spine switch 104 determines the next hop as being over an ingress interface, and forwards the join message over the ingress interface, which is connected to leaf switch 106.

It should be noted that, in FIG. 3B, a flow-certifying flag 104B of the ingress interface of the spine switch 104 is set to a negative value. This indicates that flow over the ingress interface cannot yet be certified as provisioned.

FIG. 3C illustrates the leaf switch 106 receiving the join message over an egress interface. The leaf switch 106 does not set any LHR flag, since this egress interface is a fabric interface and does not face any host.

The leaf switch 106 determines that the source host 114 is connected to an ingress interface of the leaf switch 106. Thus, in the event that the leaf switch 106 is able to satisfy all requirements to forward multicast IP packets from the source host 114, such as computational resources of the leaf switch 106 being sufficient, the leaf switch 106 sets a flow-certifying flag 106B of the ingress interface of the leaf switch 106 to a positive value. This indicates that flow over the ingress interface from the source host 114 up to the leaf switch 106 can be certified as provisioned.

FIG. 3D illustrates the leaf switch 106 propagating certification of flow provisioning downstream. The leaf switch 106 composes a downstream certifying message 120, the downstream certifying message 120 including an identifier of the leaf switch 106; an identifier of a certified ingress interface of the leaf switch 106; and the (S, G) notation of certified path information of the leaf switch 106 (the certified path information being the distribution tree notated (S1, G1) in the example illustrated in FIG. 3D). It should be understood that the identifier of the leaf switch 106 may include any character(s) and/or number(s) which uniquely identify the leaf switch to a controller host external to the PIM domain, such as a device name or identifier, a media access control ("MAC") address, and the like. It should be understood that the identifier of the certified ingress interface of the leaf switch 106 may include any character(s) and/or number(s) which uniquely identify the certified ingress interface of the leaf switch 106 from other interfaces of the leaf switch 106, to a controller host external to the PIM domain. For example, regardless of how the controller host is configured, an identifier of the certified ingress interface may be an IP address of the certified ingress interface, which uniquely identifies the certified ingress interface from all other interfaces of all other network devices (and therefore also identifies the certified ingress interface from all other interfaces of the leaf switch 106). Alternatively, in the event that the controller host is configured to identify switch interface names, an identifier of the certified ingress interface may be an interface name of the certified ingress interface, which uniquely identifies the certified ingress interface from all other interfaces of the leaf switch 106 (without necessarily uniquely identifying the certified ingress interface from all other network devices).

According to example embodiments of the present disclosure, the above-mentioned elements of a downstream certifying message 120, as well as any other elements known to persons skilled in the art for implementing such a downstream certifying message, may be recorded as one or more headers defined by a header format, such as a Type-Length-Value ("TLV") format, according to various implementations of PIM. TLV may generally refer to any encoding format which encodes a value for a particular type of field, where the type of the field is encoded in a type field, the length of the value is encoded in a length field, and the value is encoded in a value field. Thus, each of the above-mentioned elements of a downstream certifying message 120 may be defined in the TLV header format having a character length sufficient to express an identifier of the leaf switch 106; an identifier of a certified ingress interface of the leaf switch 106; and the (S, G) notation of certified path information of the leaf switch 106.

Furthermore, the leaf switch 106 compares each egress interface of the leaf switch 106 to the distribution tree (S1, G1), and is configured to perform additional actions based on whether the leaf switch 106 has a fabric interface (i.e., an interface not facing a host), a host interface (i.e., an interface facing a host), or both included in the distribution tree (S1, G1). In the event that the leaf switch 106 has a fabric interface, the leaf switch 106 forwards the downstream certifying message 120 to downstream network devices of the PIM domain network fabric over the fabric interface of the leaf switch 106. As illustrated in FIG. 3D, it may be seen that the downstream certifying message 120 is forwarded to the spine switch 104 based on the distribution tree (S1, G1).

Furthermore, in the event that the leaf switch 106 has a host interface, the leaf switch 106 is configured according to a telemetry framework to publish locally stored path information, which describes the provisioned flow, to the controller host by a control connection between the leaf switch 106 and the controller host. The controller host is, in turn, configured to receive the published path information from the leaf switch 106 according to the telemetry framework, and may analyze the published path information and perform actions based on the published path information. As illustrated in FIG. 3D, it may be seen that the leaf switch 106 does not publish path information, since it does not have any interfaces which face a host.

FIG. 3E illustrates the spine switch 104 propagating certification of flow provisioning downstream. The spine switch 104 receives the downstream certifying message 120 from the leaf switch 106. The spine switch 104 sets a flow-certifying flag 104B of the ingress interface of the leaf switch 104 to a positive value. This indicates that flow over the ingress interface from the source host 114 up to the spine switch 104 can be certified as provisioned. The spine switch 104 also caches the distribution tree (S1, G1) as local path information.

The spine switch 104 compares each egress interface of the spine switch 112 to the distribution tree (S1, G1).

Since the spine switch has a fabric interface in the distribution tree (S1, G1), the spine switch forwards the downstream certifying message 120 to downstream network devices over the fabric interface. As illustrated in FIG. 3E, it may be seen that the downstream certifying message 120 is forwarded to the leaf switch 112.

Furthermore, it may be seen that the spine switch 104 does not publish path information, since it does not have any interfaces which face a host.

FIG. 3F illustrates the leaf switch 112 certifying flow provisioning. The leaf switch 112 receives the downstream certifying message 120 from the spine switch 104. The leaf switch 112 sets a flow-certifying flag 112B of the ingress interface of the leaf switch 112 to a positive value. This indicates that flow over the ingress interface from the source host 114 up to the spine switch 112 can be certified as provisioned. The leaf switch 112 also caches the distribution tree (S1, G1) as local path information.

The leaf switch 112 compares each egress interface of the spine switch 112 to the distribution tree (S1, G1).

Since the leaf switch 112 does not have a fabric interface in the distribution tree (S1, G1), the spine switch does not forward the downstream certifying message 120.

Since the leaf switch 112 has a host interface, the leaf switch 112, according to a telemetry framework, publishes the locally cached path information, which describes the provisioned flow, to the controller host 120 by a control connection between the leaf switch 112 and the controller host 120. The controller host 120 is, in turn, configured to receive the published path information from the leaf switch 112 according to the telemetry framework, and may analyze the published path information and perform actions based on the published path information.

In this fashion, the controller host 120 receives telemetric information certifying the provisioning of an end-to-end path from the source host 114 to the destination host 116, from only a single notifier in the PIM domain.

FIG. 3G illustrates a second destination host 122 joining the PIM group. The second destination host 122 connects to an interface of the leaf switch 110 and forwards a join message over the interface, the join message indicating interest in receiving multicast IP packets from a source host 114. The leaf switch 110 references its ingress interface list 110C and egress interface list 110E, and determines that the destination host 122 has connected to an egress interface. The leaf switch 110 sets a LHR flag 110F of the egress interface to a positive value, since this egress interface faces a host.

For the purpose of illustration, the distribution tree established by the join message as it is forwarded upstream is notated (S1, G1).

The leaf switch 110 determines, according to a multi-path routing protocol such as ECMP routing, a next hop towards the source host 114. Herein, the leaf switch 110 determines the next hop as being over an ingress interface, and forwards the join message over the ingress interface, which is connected to spine switch 104.

It should be noted that, in FIG. 3G, a flow-certifying flag 110B of the ingress interface of the leaf switch 110 is set to a negative value. This indicates that flow over the ingress interface cannot yet be certified as provisioned.

As FIG. 3G further illustrates, the spine switch 104 receives the join message over an egress interface. The spine switch 104 does not set any LHR flag, since this egress interface is a fabric interface and does not face any host.

The spine switch 104 determines, based on locally cached path information, that the distribution tree (S1, G1) already provides a certified flow from the source host 114. There is no need to determine the next hop by routing. Instead, the spine switch 104 composes a downstream certifying message 120 as described above, and forwards the downstream certifying message 120 to the leaf switch 110.

FIG. 3H illustrates the leaf switch 110 certifying flow provisioning. The steps illustrated are substantially similar to those illustrated in FIG. 3F with reference to the leaf switch 112, and, for brevity, need not be reiterated.

Figure 4A:
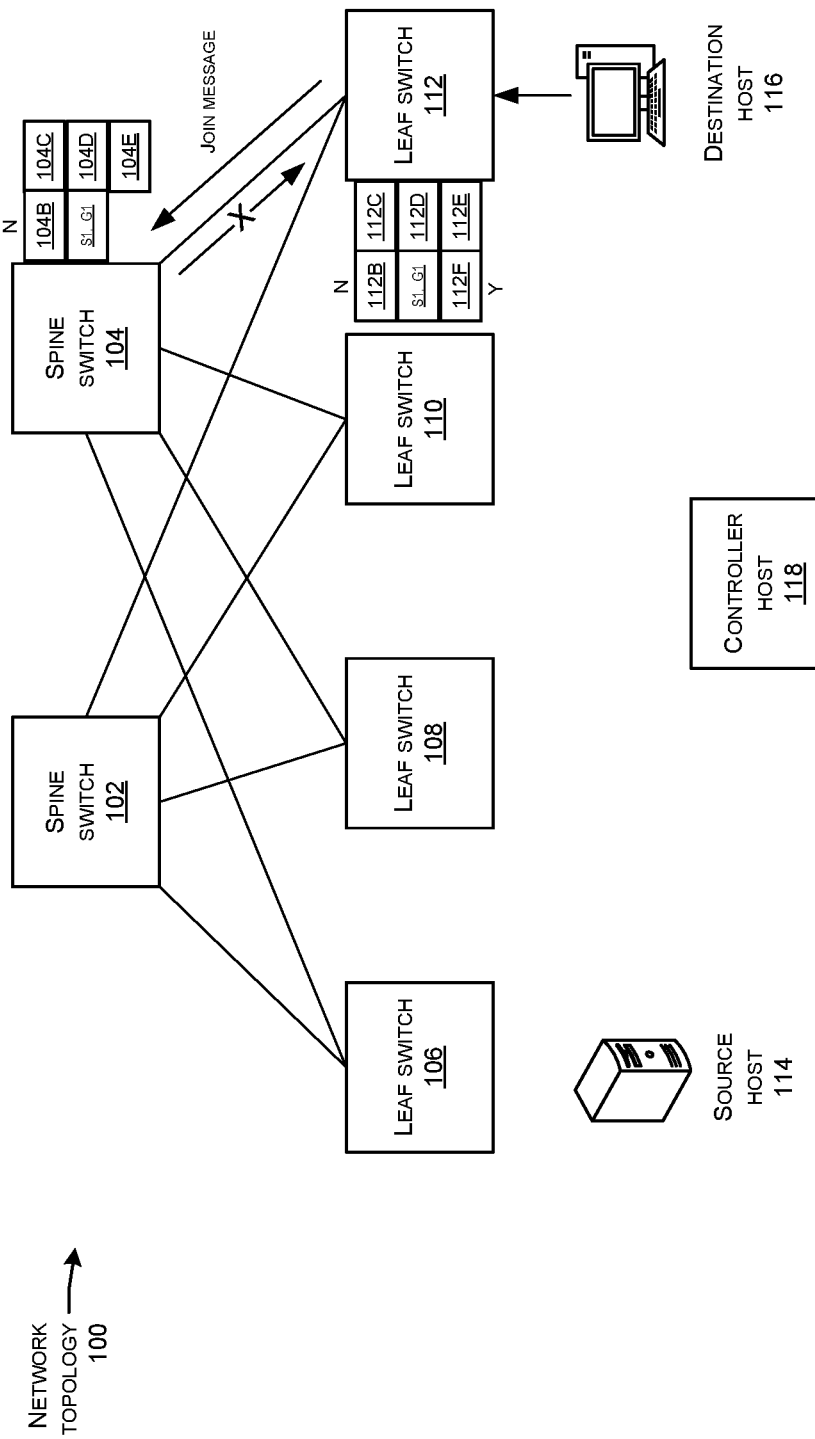
FIGS. 4A through 4F illustrate another example of flow provisioning telemetry in the network topology according to example embodiments of the present disclosure.
Figure 4B:
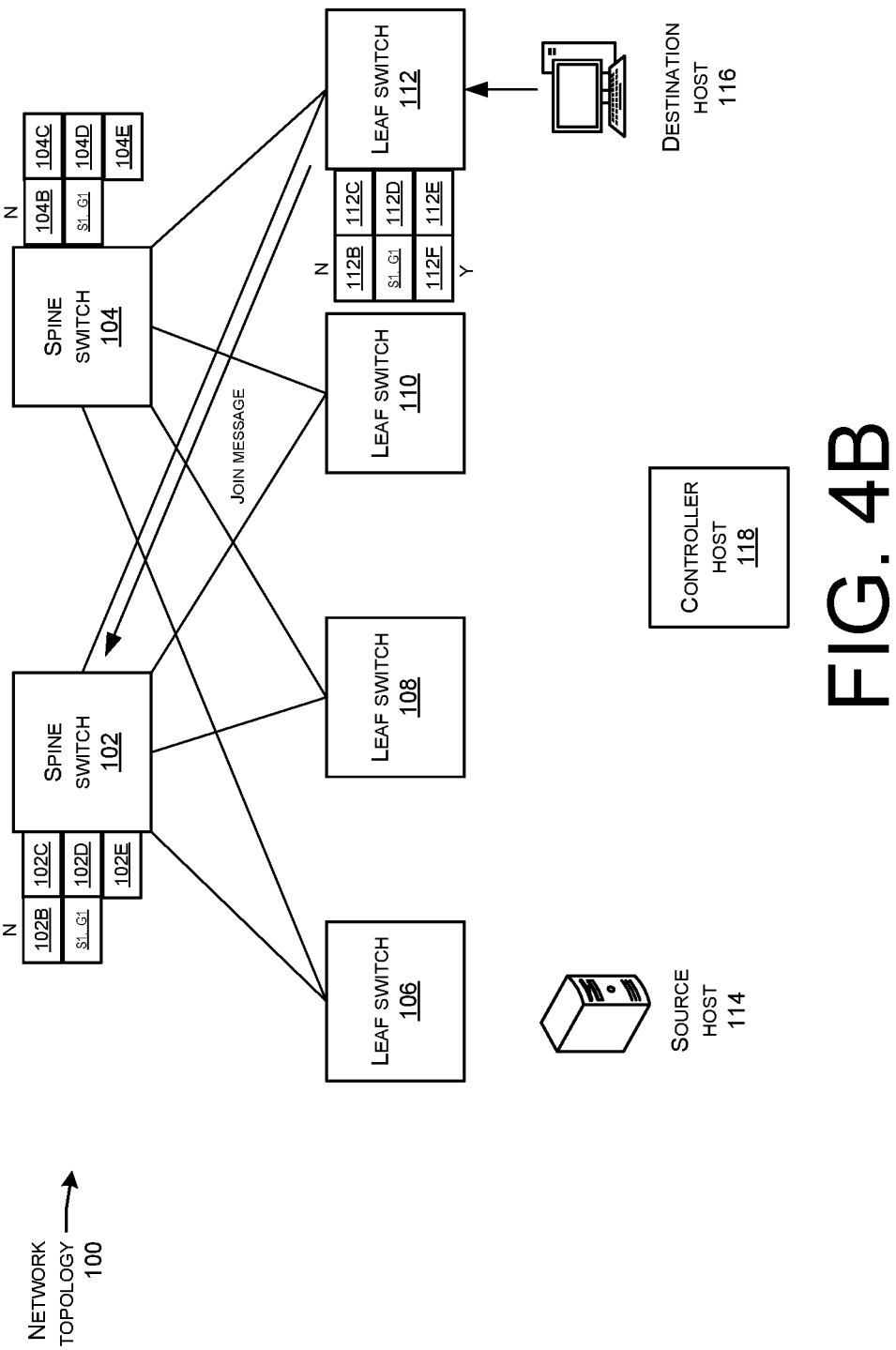
Figure 4C:
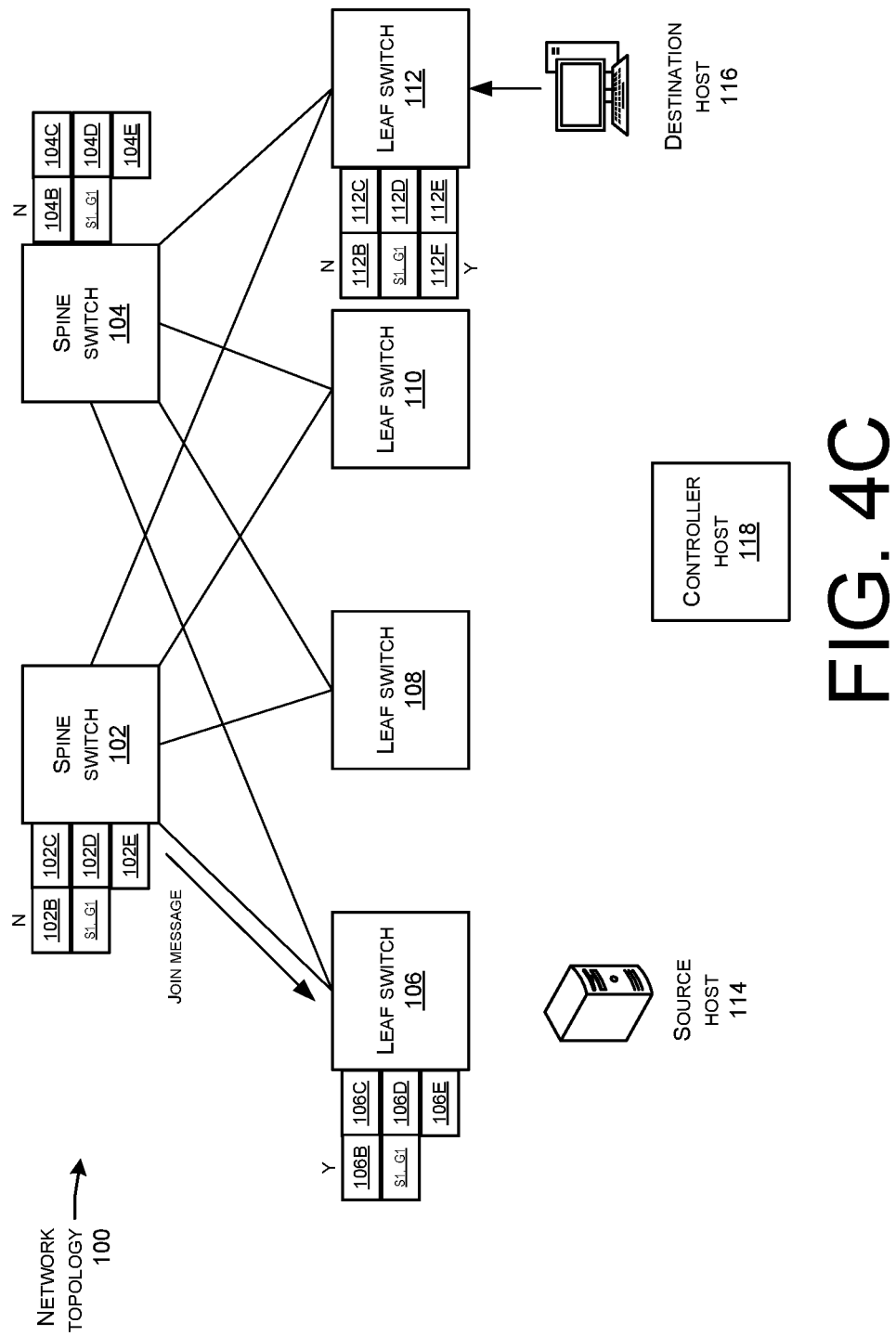
Figure 4D:
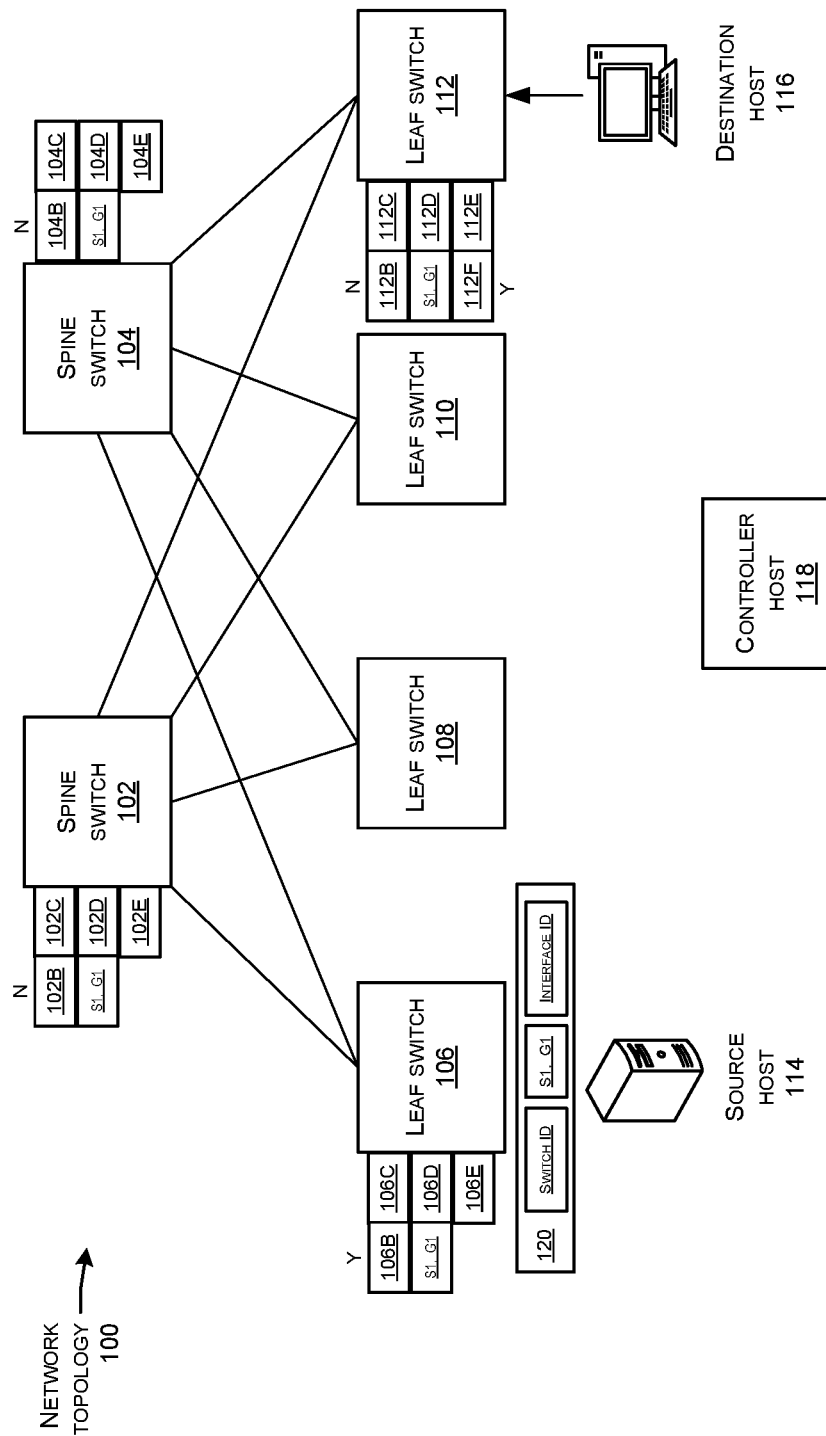
Figure 4E:
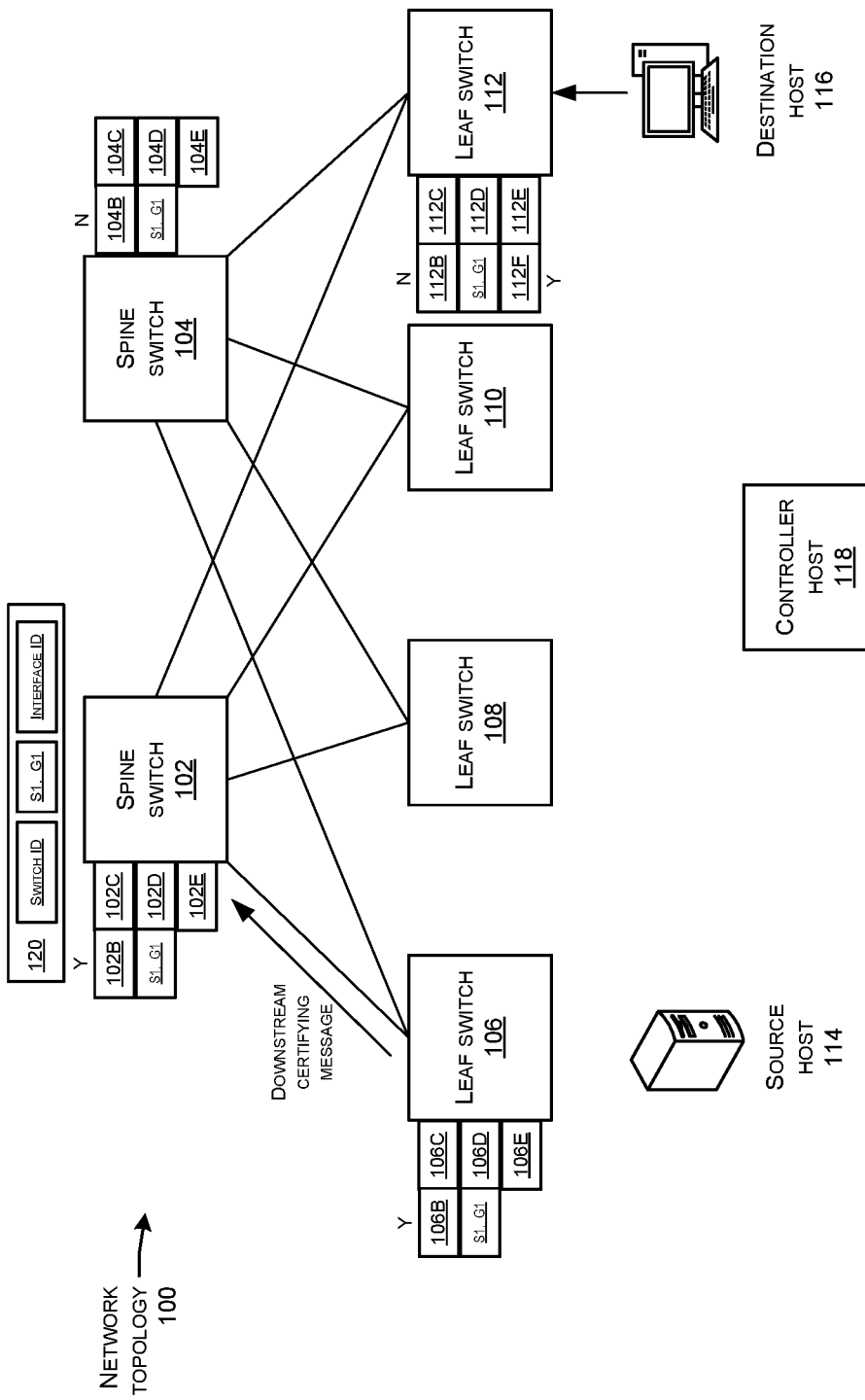
Figure 4F:
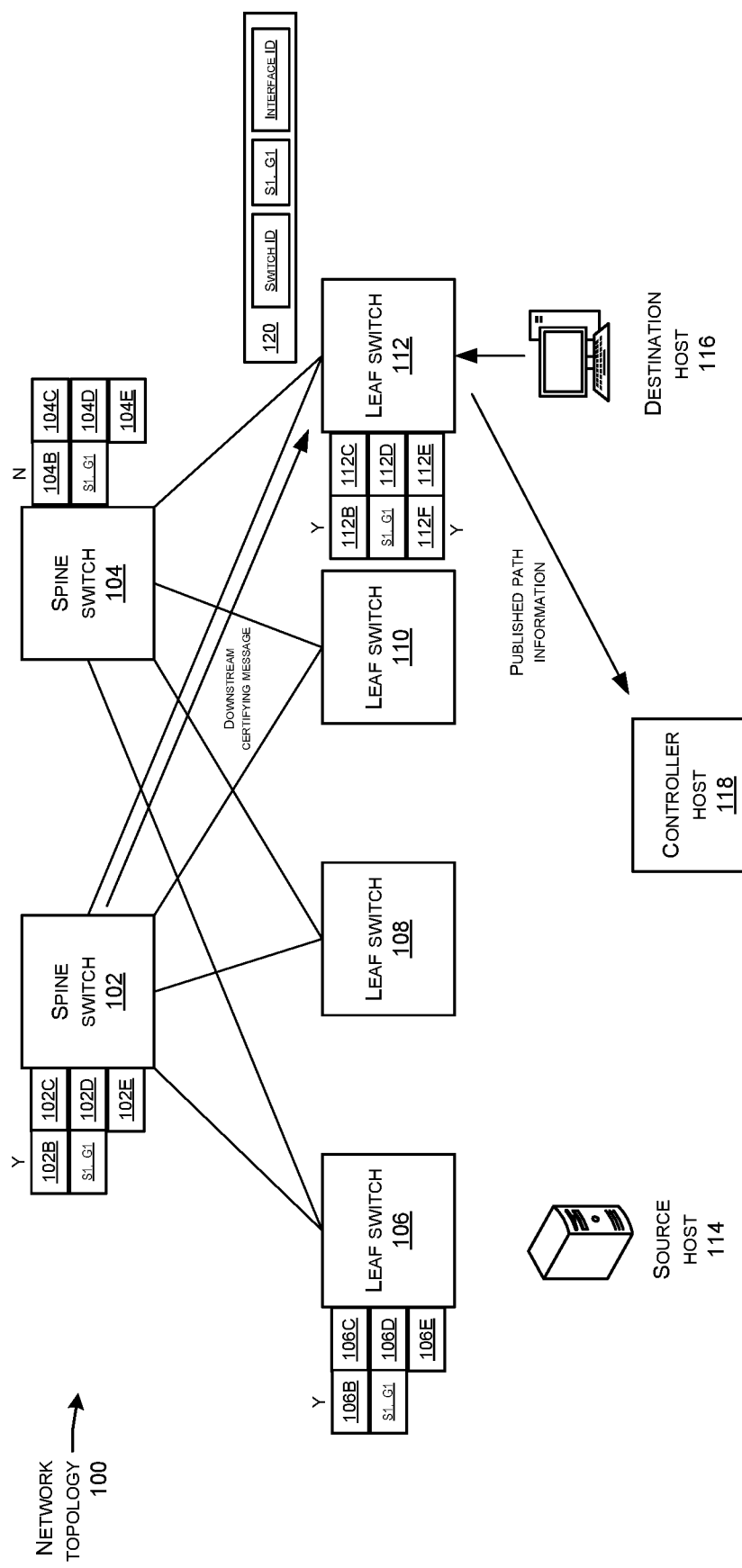

FIGS. 4A through 4F illustrate another example of flow provisioning telemetry in the network topology 100 according to example embodiments of the present disclosure. In contrast to the steps illustrated in FIGS. 3A through 3H, wherein multi-path routing successfully provisions a flow without trying multiple paths, FIGS. 4A and 4F illustrate switches of a PIM domain collectively notifying a controller host 118 of flow provisioning telemetry indicating success or failure, from a single notifier in the PIM domain, wherein multi-path routing needs to try multiple paths to successfully provision a flow.

FIG. 4A illustrates a destination host 116 joining the PIM group. As in FIG. 3A, the destination host 114 connects to an interface of the leaf switch 112 and forwards a join message over the interface, the join message indicating interest in receiving multicast IP packets from a source host 114. The leaf switch 112 references its ingress interface list 112C and egress interface list 112E, and determines that the destination host 116 has connected to an egress interface. The leaf switch 112 sets a LHR flag 112F of the egress interface to a positive value, since this egress interface faces a host.

Once again, for the purpose of illustration, the distribution tree established by the join message as it is forwarded upstream is notated (S1, G1).

The leaf switch 112 determines, according to a multi-path routing protocol such as ECMP routing, a next hop towards the source host 114. Herein, the leaf switch 112 determines the next hop as being over an ingress interface, and forwards the join message over the ingress interface, which is connected to spine switch 104.

It should be noted that, in FIG. 4A, a flow-certifying flag 112B of the ingress interface of the leaf switch 112 is set to a negative value. This indicates that flow over the ingress interface cannot yet be certified as provisioned.

Subsequently, the spine switch 104 is unable to provision a flow from the source host 114 for any arbitrary reason (such as insufficient computational resources at the spine switch 102). Therefore, according to multi-path routing protocol, such as, by way of example, ECMP routing, the spine switch 102 may return a failure message to the leaf switch 112 indicating that the spine switch 102 failed to provision a flow from the source host 114. For example, according to ECMP routing, the failure message may be implemented as a REDIRECT message as defined in Internet Engineering Task Force ("IETF") Request for Comments ("RFC") 6754, "Protocol Independent Multicast Equal-Cost Multipath (ECMP) Redirect."

The return of the failure message is not illustrated herein.

FIG. 4B illustrates the leaf switch 112 continuing to determine a next hop. Among its remaining ingress interfaces, the leaf switch 112 determines the next hop as being over a second ingress interface, and forwards the join message over the second ingress interface, which is connected to spine switch 102.

The spine switch 102 receives the join message over an egress interface. The spine switch 102 does not set any LHR flag, since this egress interface is a fabric interface and does not face any host.

The spine switch 102 determines, according to a multi-path routing protocol such as ECMP routing, a next hop towards the source host 114. Herein, the spine switch 102 determines the next hop as being over an ingress interface, and forwards the join message over the ingress interface, which is connected to leaf switch 106.

It should be noted that, in FIG. 4B, a flow-certifying flag 102B of the ingress interface of the spine switch 102 is set to a negative value. This indicates that flow over the ingress interface cannot yet be certified as provisioned.

FIG. 4C illustrates the leaf switch 106 receiving the join message over an egress interface. The leaf switch 106 does not set any LHR flag, since this egress interface is a fabric interface and does not face any host.

The leaf switch 106 determines that the source host 114 is connected to an ingress interface of the leaf switch 106. Thus, in the event that the leaf switch 106 is able to satisfy all requirements to forward multicast IP packets from the source host 114, such as computational resources of the leaf switch 106 being sufficient, the leaf switch 106 sets a flow-certifying flag 106B of the ingress interface of the leaf switch 106 to a positive value. This indicates that flow over the ingress interface from the source host 114 up to the leaf switch 106 can be certified as provisioned.

FIGS. 4D, 4E, and 4F illustrate steps substantially similar to those as illustrated in FIGS. 3D, 3E, and 3F. For brevity, these steps need not be reiterated. It suffices to say that, ultimately, the leaf switch 112 once again publishes locally cached path information, which describes a provisioned flow from the source host 114 to the destination host 116, to the controller host 120. In this fashion, the controller host 120 once again receives telemetric information certifying the provisioning of an end-to-end path from the source host 114 to the destination host 116, from only a single notifier in the PIM domain. Moreover, the failure to provision the flow as described with reference to FIG. 4A does not cause any publication of path information and does not cause any notification to the controller host 120.

Therefore, according example embodiments of the present disclosure, a controller host is notified of path provisioning success by passing a downstream certifying message within the PIM domain to a single notifier, so that only a single notifier publishes telemetric information certifying successful path provisioning. Thus, computational workload and network traffic for streaming data related to certifying path provisioning is kept to a minimum for each flow that needs to be certified, which also keeps compounding of network traffic for many different flows to a minimum. Moreover, since controller hosts are notified upon successful provisioning but not at other times, controller hosts can trust that the telemetric data is minimally latent, and may be relied upon to enact timely actions which produce desired outcomes.

Figure 5:
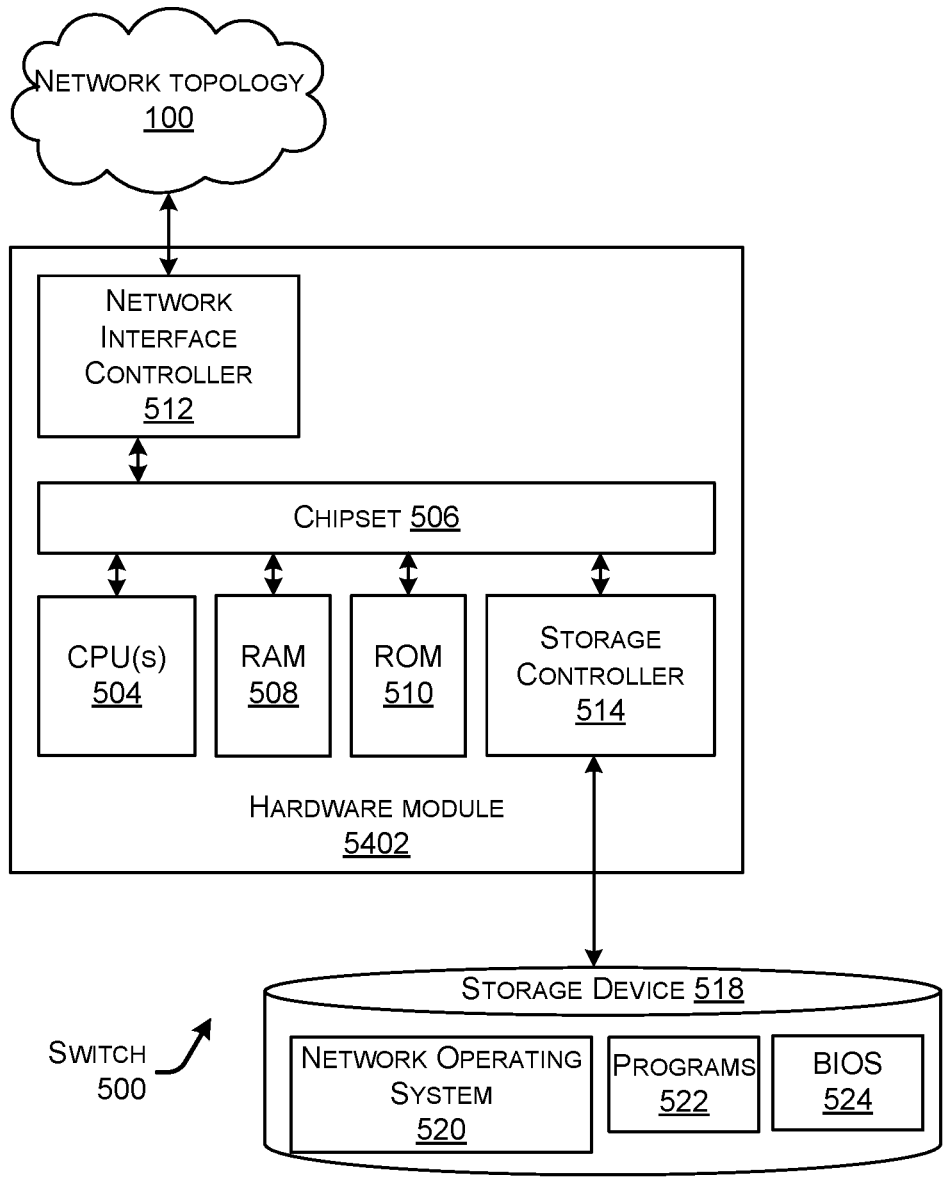
FIG. 5 shows an example computer architecture for a switch capable of executing program components for implementing the functionality described above.

FIG. 5 shows an example computer architecture for a switch 500 capable of executing program components for implementing the functionality described above. The computer architecture shown in FIG. 5 illustrates a computing device assembled from modular components, and can be utilized to execute any of the software components presented herein. The switch 500 may, in some examples, be a multilayer switch as described above.

One or more hardware modules 502 installed in a switch 500 may be a physical card or module to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the hardware module 502.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the hardware module 502. The chipset 506 can provide an interface to a RAM 508, used as the main memory in the hardware module 502. The chipset 506 can further provide an interface to a computer-readable storage medium such as a read-only memory ("ROM") 510 or non-volatile RAM ("NVRAM") for storing basic routines that help to startup the hardware module 502 and to transfer information between the various components and devices. The ROM 510 or NVRAM can also store other software components necessary for the operation of the hardware module 502 in accordance with the configurations described herein.

The hardware module 502 can operate in a networked environment using logical connections to remote computing devices and computer systems through a network, such as the network topology 100 as described above. The chipset 506 can include functionality for providing network connectivity through a NIC 512, such as a gigabit Ethernet adapter. The NIC 512 is capable of connecting the hardware module 502 to other computing devices over the network 508. It should be appreciated that multiple NICs 512 can be present in the hardware module 502, connecting the switch 500 to other types of networks and remote computer systems.

The hardware module 502 can be connected to a storage device 518 that provides non-volatile storage for the hardware module 502. The storage device 518 can store an operating system 520, programs 522, a BIOS 524, and data, which have been described in greater detail herein. The storage device 518 can be connected to the hardware module 502 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The hardware module 502 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the hardware module 502 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The hardware module 502 can further read information from the storage device 518 by detecting the physical states or characteristics of one or more particular locations within the physical storage units.

In addition to the mass storage device 518 described above, the hardware module 502 can have access to other computer-readable storage media to store and retrieve information, such as program modules, data structures, or other data. It should be appreciated by those skilled in the art that computer-readable storage media is any available media that provides for the non-transitory storage of data and that can be accessed by the hardware module 502. In some examples, the operations performed by a switch of the network overlay, and or any components included therein, may be supported by one or more devices similar to the hardware module 502. Stated otherwise, some or all of the operations performed by a switch of the network overlay, and or any components included therein, may be performed by one or more hardware modules 502 operating in a networked, distributed arrangement over one or more logical fabric planes over one or more networks.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 420 utilized to control the operation of the hardware module 502. According to one embodiment, the operating system comprises the LINUX or NETBSD operating system and derivatives thereof. According to another embodiment, the operating system comprises the San Jose, Calif., or any other suitable network operating system. It should be appreciated that other operating systems can also be utilized. The storage device 518 can store other system or application programs and data utilized by the hardware module 502.

In one embodiment, the storage device 518 or other computer-readable storage media is encoded with computer-executable instructions which, when loaded into a computer, transform the computer from a general-purpose computing system into a special-purpose computer capable of implementing the embodiments described herein. These computer-executable instructions transform the hardware module 502 by specifying how the CPUs 504 transition between states, as described above. According to one embodiment, the hardware module 502 has access to computer-readable storage media storing computer-executable instructions which, when executed by the hardware module 502, perform the various processes described above with regard to FIGS. 1-4F. The hardware module 502 can also include computer-readable storage media having instructions stored thereupon for performing any of the other computer-implemented operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A switch comprising:
one or more processors; and
one or more non-transitory computer-readable media storing computer-executable instructions that, when executed by the one or more processors, cause the one or more processors to:
compare each interface of the switch to certified path information of a Protocol Independent Multicast ("PIM") domain;
determine that a first egress interface of the switch is a fabric interface of the certified path information;
forward a downstream certifying message over the first egress interface, the downstream certifying message comprising the certified path information; and
determine that a second egress interface of the switch has a last hop router flag set to a positive value.

2. The switch of claim 1, wherein the instructions further cause the one or more processors to compose the downstream certifying message, the downstream certifying message further comprising an identifier of the switch and an identifier of a certified ingress interface of the switch.

3. The switch of claim 2, wherein the instructions further cause the one or more processors to set a flow-certifying flag of the certified ingress interface of the switch to a positive value.

4. The switch of claim 1, wherein the instructions further cause the one or more processors to receive the downstream certifying message over an ingress interface of the switch.

5. The switch of claim 4, wherein the instructions further cause the one or more processors to set a flow-certifying flag of the ingress interface of the switch to a positive value.

6. The switch of claim 1, wherein the instructions further cause the one or more processors to publish the certified path information for a controller host outside the PIM domain according to a telemetry framework.

7. A switch comprising:
one or more processors; and
one or more non-transitory computer-readable media storing computer-executable instructions that, when executed by the one or more processors, cause the one or more processors to:
receive a Protocol Independent Multicast ("PIM") join message over a first egress interface of the switch;
determine a first next hop over a first ingress interface towards a source host according to a multi-path routing protocol;

determine a second next hop over a second ingress interface towards the source host;

forward a downstream certifying message over the first egress interface, the downstream certifying message comprising the second ingress interface and not comprising the first ingress interface; and determine that a second egress interface of the switch has a last hop router flag set to a positive value.

8. A method comprising:

comparing, by a switch of a Protocol Independent Multicast ("PIM") domain, each interface of the switch to certified path information of the PIM domain;

determining, by the switch, that a first egress interface of the switch is a fabric interface of the certified path information;

forwarding, by the switch, a downstream certifying message over the first egress interface, the downstream certifying message comprising the certified path information; and determining, by the switch, that a second egress interface of the switch has a last hop router flag set to a positive value.

9. The method of claim 8, further comprising composing, by the switch, the downstream certifying message, the downstream certifying message further comprising an identifier of the switch and an identifier of a certified ingress interface of the switch.

10. The method of claim 9, further comprising setting, by the switch, a flow-certifying flag of the certified ingress interface of the switch to a positive value.

11. The method of claim 8, further comprising receiving, by the switch, the downstream certifying message over an ingress interface of the switch.

12. The method of claim 11, further comprising setting, by the switch, a flow-certifying flag of the ingress interface of the switch to a positive value.

13. The method of claim 8, further comprising publishing, by the switch, the certified path information for a controller host outside the PIM domain according to a telemetry framework.

14. The switch of claim 7, wherein the instructions further cause the one or more processors to publish the certified path information for a controller host outside the PIM domain according to a telemetry framework.

15. The switch of claim 7, wherein the instructions further cause the one or more processors to compose the downstream certifying message, the downstream certifying message further comprising an identifier of the switch and an identifier of a certified ingress interface of the switch.

16. The switch of claim 15, wherein the instructions further cause the one or more processors to set a flow-certifying flag of the certified ingress interface of the switch to a positive value.

17. The switch of claim 7, wherein the instructions further cause the one or more processors to receive the downstream certifying message over an ingress interface of the switch.

* * * * *